US008226465B2

(12) United States Patent
Walker et al.

(10) Patent No.: US 8,226,465 B2
(45) Date of Patent: Jul. 24, 2012

(54) SYSTEMS AND METHODS FOR REWARDING GROUP PARTICIPATION IN LOTTERY GAMES

(75) Inventors: Jay S. Walker, Ridgefield, CT (US); Jon E. Ellenthal, Wilton, CT (US); Nancy Palumbo, New York, NY (US); Stephen C. Tulley, Monroe, CT (US)

(73) Assignee: Walker Digital, LLC, Stamford, CT (US)

( * ) Notice: Subject to any disclaimer, the term of this patent is extended or adjusted under 35 U.S.C. 154(b) by 298 days.

(21) Appl. No.: 12/605,150

(22) Filed: Oct. 23, 2009

(65) Prior Publication Data

US 2010/0105462 A1 Apr. 29, 2010

Related U.S. Application Data

(60) Provisional application No. 61/107,920, filed on Oct. 23, 2008, provisional application No. 61/107,918, filed on Oct. 23, 2008.

(51) Int. Cl.
*G06F 17/00* (2006.01)

(52) U.S. Cl. ........................................................ 463/17

(58) Field of Classification Search ............... 463/16–25
See application file for complete search history.

(56) References Cited

U.S. PATENT DOCUMENTS

| | | | | |
|---|---|---|---|---|
| 5,417,424 | A | 5/1995 | Snowden | |
| 5,830,063 | A | 11/1998 | Byrne | |
| 5,910,047 | A | 6/1999 | Scagnelli | |
| 6,086,477 | A | 7/2000 | Walker et al. | |
| 6,168,521 | B1 | 1/2001 | Luciano | |
| 6,203,011 | B1 * | 3/2001 | Nulph | 273/138.2 |
| 6,251,016 | B1 | 6/2001 | Tsuda | |
| 6,277,026 | B1 * | 8/2001 | Archer | 463/42 |
| 6,312,332 | B1 | 11/2001 | Walker et al. | |
| 6,322,446 | B1 | 11/2001 | Yacenda | |
| 6,336,862 | B1 | 1/2002 | Byrne | |
| 6,383,078 | B1 | 5/2002 | Yacenda | |
| 6,869,358 | B2 | 3/2005 | Yacenda | |
| 7,374,483 | B2 | 5/2008 | Wiltshire | |
| 7,384,333 | B2 * | 6/2008 | Walker et al. | 463/17 |
| 7,387,569 | B2 * | 6/2008 | Walker et al. | 463/17 |
| 7,590,950 | B2 * | 9/2009 | Collins et al. | 715/864 |
| 7,780,514 | B2 * | 8/2010 | Walker et al. | 463/17 |

OTHER PUBLICATIONS

Texas Lotto Club (http:/www.texaslottoclub.com) copyright 1997, download date: Feb. 1, 2012, 1 pg.
Texas Lotto Club (http:/www.texaslottoclub.com) copyright 2012, download date: Feb. 1, 2012, 1 pg.

* cited by examiner

*Primary Examiner* — Ronald Laneau
(74) *Attorney, Agent, or Firm* — Michael D. Downs; Fincham Downs, LLC

(57) ABSTRACT

In accordance with some exemplary and non-limiting embodiments, a system, a method, an apparatus and a computer readable medium are provided for determining sets of winning numbers for a first lottery drawing and a second lottery drawing, determining a performance score of a group of participants based on entries of the group eligible for the first lottery drawing and for the second lottery drawing, and determining an award (e.g., a secondary award) based on the performance score of the group.

30 Claims, 15 Drawing Sheets

1

2

400

| | GAME IDENTIFIER 402 | GAME RULES 406 | PAYOUT CRITERIA 1 408 | PAYOUT 1 410 | | PAYOUT CRITERIA N 412 | PAYOUT N 414 |
|---|---|---|---|---|---|---|---|
| R400-1 | GM-DRAW-001 | "MATCH AT LEAST 3 OF 6 DRAWN NUMBERS..." | 3/6 | $3 | ∘ ∘ ∘ | 6/6 | TOP PRIZE (TBD) |
| R400-2 | GM-DRAW-002 | "MATCH THE 3 DRAWN NUMBERS IN EXACT ORDER..." | 1/3 | $3 | ∘ ∘ ∘ | 3/3 | $500 |
| R400-3 | GM-DRAW-003 | "MATCH THE 4 DRAWN NUMBERS IN ANY ORDER..." | 2/4 | $5 | ∘ ∘ ∘ | 4/4 | $5000 |
| | ⋮ | ⋮ | ⋮ | ⋮ | | ⋮ | ⋮ |
| R400-(N-1) | GM-DRAW-N | "SELECT UP TO TEN NUMBERS FROM THE FIELD OF 1-80..." | 1 SPOT, 1 MATCH | $2 | ∘ ∘ ∘ | 10 SPOTS, 10 MATCHES | 100,000 |
| R400-N | GM-INSTANT-N | "SCRATCH-OFF THE PLAY AREA. MATCH ANY ..." | N/A | $2 | ∘ ∘ ∘ | N/A | $1,000 |

FIG. 11

500

| | GROUP GAME IDENTIFIER 502 | GROUP GAME RULES 504 | PAYOUT CRITERIA 1 506 | PAYOUT 1 508 | ... | PAYOUT CRITERIA N 510 | PAYOUT N 512 |
|---|---|---|---|---|---|---|---|
| R500-1 | GPGM-DRAW-001 | "MATCH AT LEAST [X] DRAWN NUMBERS OVER [Y] TIME..." | [X]/[Y] | 200 POINTS | ... | N/A | N/A |
| R500-2 | GPGM-DRAW-002 | "ACHIEVE A DRAWN:PLAYED RATIO OF AT LEAST [Z]" | RATIO = [Z] | $100 | ... | RATIO = [2Z] | $1,000 |
| R500-3 | GPGM-DRAW-003 | "ACHIEVE THE LOWEST DIFFERENTIAL BETWEEN..." | DIFF. < 200 | FREE GAME | ... | DIFF. < 15 | VACATION GETAWAY |
| | ... | ... | ... | ... | | ... | ... |
| R500-(N-1) | GPGM-DRAW-N | "COLLECT THE MOST MATCHES AMONG SIMILAR GROUPS..." | SCORE 1 > SCORE 2 | VIRT. MERIT BADGE | ... | N/A | N/A |
| R500-N | GPGM-INSTANT-N | "ACHIVE THE HIGHEST PER-MEMBER AVERAGE PAYOUT..." | AVG. 1 > AVG. 2 | $10 PER-PLAYER | ... | N/A | N/A |

FIG. 12

SYSTEMS AND METHODS FOR REWARDING GROUP PARTICIPATION IN LOTTERY GAMES

CROSS-REFERENCE TO RELATED APPLICATIONS

The present application claims the benefit of U.S. Provisional Patent Application No. 61/107,918, filed Oct. 23, 2008, entitled "SYSTEMS AND METHODS FOR REWARDING GROUP PARTICIPATION IN LOTTERY GAMES," which is incorporated herein by reference in its entirety.

The present application claims the benefit of U.S. Provisional Patent Application No. 61/107,920, filed Oct. 23, 2008, entitled "LOTTERY SOCIAL PLAY PLATFORM," which is incorporated herein by reference in its entirety.

FIELD OF THE INVENTION

The invention generally relates to play of lottery games.

BRIEF DESCRIPTION OF THE DRAWINGS

FIG. 11 is a diagram of an exemplary and non-limiting embodiment of a database according to the disclosure.

FIG. 12 is a diagram of an exemplary and non-limiting embodiment of a database according to the disclosure.

DETAILED DESCRIPTION OF THE INVENTION

Figure 1:
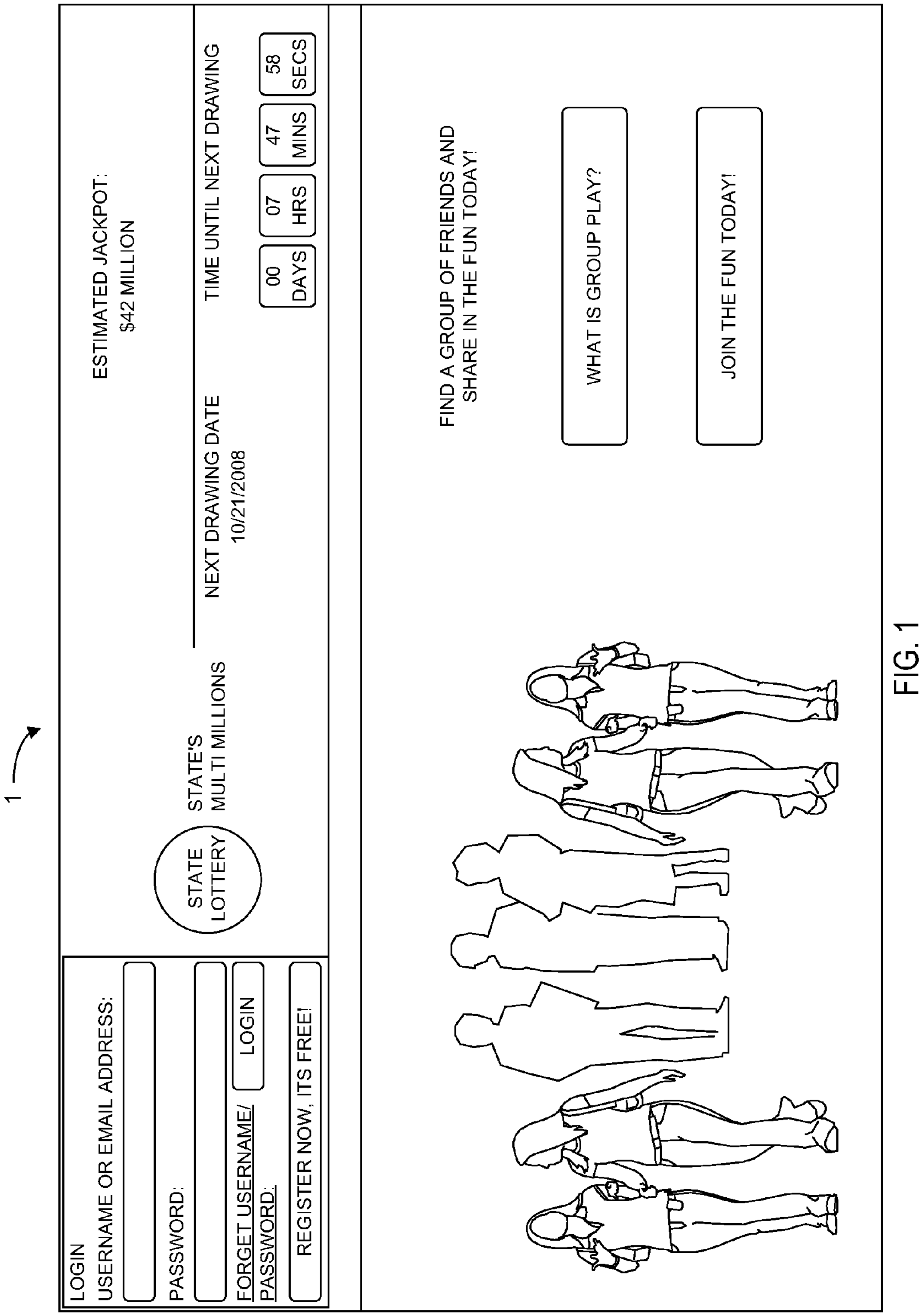
FIG. 1 is a representation of an exemplary and non-limiting embodiment of a user interface according to the disclosure.

In accordance with exemplary and non-limiting embodiments, there are disclosed herein, among other things, systems, methods, apparatus and computer readable media for allowing a group, team, pool or other associations of users (e.g., a group of lottery players who are pooling multiple lottery entries to share in any potential winnings) participating in at least one primary game (e.g., one or more lottery drawing games or instant games) to be rewarded as a group for its participation in the primary game(s). For example, a group of lottery players could be awarded a prize as a group, in addition to any winnings that are based on the rules of the primary game(s)), based on the group's collective performance in the primary game(s).

In accordance with exemplary and non-limiting embodiments, there are disclosed herein, among other things, systems, methods, apparatus and computer readable media for allowing multiple groups, teams, pools or other associations of users (e.g., two or more teams of lottery players) participating in a primary game (e.g., a primary lottery drawing game) to compete against one or more other associations of users in a group-based secondary game (e.g., for a chance to win additional prizes for a team of lottery players based on the team's performance or ranking in the primary game relative to other teams).

In accordance with exemplary and non-limiting embodiments, there are disclosed herein, among other things, systems, methods, computer readable media and apparatus for an individual member of one of a plurality of groups, teams, pools or other associations of lottery players (e.g., an individual member of one or more of a plurality of lottery teams associated with the same weekly lottery drawing) to compete against other members of the individual's team, pool or other association in a secondary game (e.g., for a chance to win additional individual prizes).

In accordance with exemplary and non-limiting embodiments, there are disclosed herein, among other things, systems, methods, computer readable media and apparatus providing for determining a set of winning numbers for a first lottery drawing, determining a set of winning numbers for a second lottery drawing, determining a group of participants in the first and second lottery drawings, determining a first plurality of lottery entries associated with the group and eligible for the first lottery drawing, determining a second plurality of lottery entries associated with the group and eligible for the second lottery drawing, determining a performance score of the group and determining an award for the group based on the performance score of the group.

In accordance with exemplary and non-limiting embodiments, there are disclosed herein, among other things, systems, methods, computer readable media and apparatus providing for determining a set of winning numbers for a first lottery drawing, determining a set of winning numbers for a second lottery drawing, determining a first lottery team, determining a second lottery team, determining a first plurality of lottery entries associated with the first lottery team, determining a second plurality of lottery entries associated with the second lottery team, determining a team score for the first team based on the first plurality of lottery entries and the set of winning numbers for the first lottery drawing, determining a team score for the second team based on the second plurality of lottery entries and the set of winning numbers for the second lottery drawing, and determining that the first team qualifies for an award based on the team score for the first team and the team score for the second team.

In accordance with exemplary and non-limiting embodiments, there are disclosed herein, among other things, systems, methods, computer readable media and apparatus providing for receiving an indication of at least a first entry and a second entry associated with a group of players and eligible for a first lottery drawing, receiving an indication of at least a third entry and a fourth entry associated with the group of players and eligible for a second lottery drawing, determining a set of winning numbers for the first lottery drawing, determining a set of winning numbers for the second lottery drawing, determining a group total of numbers matched by the collective entries of the group in the first and second lottery drawings, and determining a payout for the group for a secondary game based on the group total of numbers matched in the first and second lottery drawings.

According to some non-limiting embodiments, a lottery player may participate in a secondary game with at least one other lottery player on the same lottery team by determining a total number of symbols from each of the lottery tickets associated with the lottery team (e.g., each of three Pick-6 lottery entries for each of three separate drawings) that match corresponding lottery game outcomes (e.g., sets of winning numbers drawn in lottery drawings).

In another exemplary embodiment, a lottery team comprised of a plurality of players may be formed by associating lottery tickets for one or more lottery drawings with one another (e.g., through a lottery terminal, a Web site, etc.). Players may keep their original tickets, as well as any winnings from those individual tickets. Alternatively, players may prefer to share or pool the tickets of the team members and allocate or share, among the members of the group, any total winnings from the individual tickets. According to some embodiments, the team may also have the opportunity to win additional prizes by combining the symbols of their collective entries, comparing them to the drawn numbers and determining a performance score for the team that can be compared to performance scores of other teams.

Alternatively, or in addition, one or more members of a team or group may have the opportunity to win an additional individual prize by comparing the symbols across a plurality of tickets (for one or more lottery drawings) to the drawn numbers (for the one or more corresponding lottery drawings) and determining a performance score for the individual that can be compared to performance scores of other members of the team and/or to other individuals on other teams.

According to other exemplary and non-limiting embodiments, information associated with one or more winning lottery outcomes may be transmitted to, received by and stored by a player's personal device (e.g., a computer, a cell phone, etc). In some embodiments, the information associated with one or more winning lottery outcomes may be output by a lottery retailer terminal or a lottery server (e.g., operated on behalf of a lottery authority). For example, a lottery agent may receive a lottery ticket from a player and insert the ticket into a lottery retailer terminal to determine whether the ticket has won (e.g., individual ticket, or a combined ticket symbols win). In another example, a player's personal computer may receive, via a browser application, information about one or more winning lottery outcomes from a web server.

In accordance with exemplary and non-limiting embodiments of the invention, a computer readable medium is encoded with instructions for directing a processor to associate at least one lottery ticket with a group comprising at least two members, each member being associated with at least one respective lottery ticket associated with the group, determine at least one lottery outcome, based on the plurality of symbols of all of the lottery tickets associated with the group and the at least one lottery outcome, determine a performance measure for the group and determine a payout for the group based upon the performance measure. In one embodiment, the payout based upon the performance measure is in addition to or otherwise different any winnings associated with the lottery tickets for matching the at least one lottery outcome (e.g., in accordance with the established rules for a primary lottery drawing game).

In accordance with another exemplary and non-limiting embodiment of the invention, a method comprises receiving a request from at least one lottery player to purchase at least one lottery ticket comprising a plurality of symbols, issuing the at least one lottery ticket to the lottery player, associating the at least one lottery ticket with a lottery team comprising at least one other lottery player associated with at least one other lottery ticket associated with the lottery team, determining an occurrence of a qualifying event based on the plurality of symbols of all of the lottery tickets associated with the lottery team, and determining a payout for the lottery team based upon the occurrence of the qualifying event. In one embodiment, at least one of the lottery tickets associated with the lottery team is for a first lottery drawing and at least one of the lottery tickets associated with the lottery team is associated with a second lottery drawing, and the qualifying event comprises matching at least one symbol of at least one ticket in each of the first and second lottery drawings.

Groups of lottery players often elect to participate in so-called lottery "pools". In a traditional lottery pool, individual group members contributes funds toward the purchase of several lottery tickets (or entries) for a lottery drawing, with the understanding that any resultant winnings are to be shared (e.g., equally) among all contributing group members. Upon conclusion of the lottery drawing, if one or more of the purchased tickets has qualified for a payout or prize, the total of such payout or prize would then be distributed among the contributing group members. Thus, if one of twenty purchased tickets qualified for a $100,000 pre-tax payout, each of the ten contributing group members could receive a 10% "share" or $10,000 before taxes.

The practice of pooling affords group members the benefit of acquiring an interest in a large number of tickets relative to each member's individual financial contribution. Lottery pools and other groups of lottery players represent a unique and valuable segment of the player base for many lotteries. For example, members of groups/pools typically play more frequently than so-called "casual" players. Applicants have recognized that it would be beneficial for a service provider to offer additional benefits (e.g., enhanced payout structures and/or other value added services) to encourage and reward increased participation among the entire eligible population of potential players, including but not limited to participation by pools, teams or other groups.

According to some embodiments, group performance associated with a plurality of lottery entries is determined based on the entries' performance over a series of at least two lottery drawings. For example, a group of office workers may purchase twenty lottery entries for each of ten lottery drawings occurring within a given calendar month. For each of the ten drawings, a performance score is determined and/or adjusted based on (i) information associated with each individual entry of all of the group's total entries (e.g., numbers played for each entry) and (ii) information associated with a corresponding lottery drawing (e.g., numbers drawn during an associated drawing). Upon the conclusion of the series of lottery drawings (e.g., at the end of the month) a final performance score may be determined and an award (e.g., a payout or prize) may be provided based on the group's performance.

In some embodiments, awards may be determined and/or provided based on (i) the group's performance relative to one or more other group(s), (ii) solely on the basis of the group's overall performance (or performance score) and/or (iii) a combination of (i) and (ii). Groups may be organized (e.g., into competitive leagues) for the purpose of ranking or otherwise comparing performance, on the basis of size, a particular geographic area associated with the groups, on a number of lottery entries associated with the group, etc.

Exemplary techniques for determining and/or adjusting a performance score (including a final score or ranking) may include determining a total differential between lottery numbers played and lottery numbers drawn (e.g., where the group(s) with the lowest differential score best) and/or determining a ratio of payouts won (e.g., based on total number of payouts for the group, or total dollars won) to tickets purchased among all of the group's members.

According to some embodiments, payouts may be provided to individual group members based on the individual members' performance within their respective group. For example, in some embodiments, individual lottery entries (from among all group entries) may be allocated (or assigned) to one or more group member(s), and the performance of each individual's entries may be monitored in order to determine and/or adjust an individual performance score associated therewith. In some embodiments, the best-performing member(s) within each given group may qualify for a respective payout or other prize based on their associated individual performance(s) (or score(s)).

According to some embodiments, the above functionalities may be supported via a web-based group play management system. The management system may be operated by one or more of a lottery (e.g. a state lottery, such as the New York Lottery), a lottery vendor (e.g., a contracted partner of a state lottery) and/or a third party operator (e.g. a party who is neither a lottery nor a vendor).

A group play management system may operate to allow for the creation of groups in accordance with one or more desired group parameter(s). Such parameters may include, but are not limited to, a group name, a number of members, preferred game(s), a preferred system of prize distribution, one or reinvestment/repurchase levels, alert preferences (e.g., for receiving notifications of group information and/or lottery events), etc.

In addition, a group play management system may operate to allow at least one member of a group (e.g., a "captain" or other group leader) to establish and configure certain aspects of group play. Such aspects may include, but are not limited to, frequency (e.g., every Tuesday and Friday) and duration (e.g., one month, 12 drawings, etc.) of group play, preferred game(s) (e.g., "pick-5", "pick-6", etc.), per-member contribution per game instance (e.g., each member may contribute up to $X per lottery drawing and/or up to $Y for the series of drawings), and individual entry configuration options (e.g., individual group members may be permitted to select their preferred lottery numbers vs. "quick pick"). In accordance with some embodiments, additional functionality afforded by a group play management system may allow for at least one group member to add or remove group members, track and record individual members' payments and to collect information from (and distribute information to) group members (e.g., conduct polls, send alerts and other messages, etc.).

As used herein, a "player" may refer to a participant in a lottery game. Such participation may be the result of a player purchasing or otherwise acquiring a lottery ticket or potentially sharing in winnings associated with a lottery entry. As used herein, a "member" may refer to a member of a group who is also a participant in a lottery game and/or group- or team-based secondary game. Such participation may be the result of an individual registering as a member of a group or team associated with one or more lottery tickets or other lottery entries.

As used herein, a "group" may refer to a plurality of participants in a lottery game or one or more lottery drawings (e.g., a team of lottery pool participants registered with a central controller or group play management system). As used herein, a group is a subset of all of the players or ticket holders participating in a particular lottery game or lottery drawing. A "team" or a "lottery team" is one example of a group.

In accordance with some exemplary embodiments, a performance score may be determined based on a set of associated lottery tickets (e.g., 4 individual lottery tickets). The ticket holders or lottery pool members may participate in a group- or team-based secondary game that combines the tickets for team play with the potential to win additional prizes.

In accordance with other exemplary and non-limiting examples, individual tickets may be purchased and then associated with one or more other tickets. For example, Mike visits his local convenience store and asks the store clerk for a lottery ticket for Friday night's drawing. Once Mike gets into his office, he visits a group play management Web site, creates a lottery team and invites his friends for team play.

As used herein, a "social network" refers to a network of individuals that may be mapped based on personal or professional relationships. Examples of a social network may include: a group of friends, a group of co-workers, or a group of individuals with a common interest (e.g., photography). In a preferred embodiment, the term "social network" may refer to one of number of websites known in the art such as: "MySpace", "Facebook", "Friendster", and/or "Linked-In".

As used herein, a "lottery entry" is an entry into a lottery or other game of chance. As used within this disclosure, the phrases "lottery entry" and "entry into a game of chance" shall be synonymous. Other examples of games of chance include games like keno, baccarat, blackjack, poker, video poker, and slot machines, as well as sweepstakes like the Publishers Clearinghouse Sweepstakes™.

As used herein, a "lottery outcome" is an outcome resulting from a game of chance. A lottery outcome may involve choosing one or more winners by randomly selecting from a set of entries, or may be of the instant win type (e.g., Massachusetts State Lottery's "Fabulous Fortune" instant game ticket). A winning lottery outcome may also be associated with matching one or more indicia with a set of randomly generated indicia (e.g., in a lottery drawing).

As used herein, a "lottery drawing" is a drawing for a lottery game, such as a state lotto game, and may involve generating indicia (e.g., winning lottery numbers) for comparing with entries eligible for the lottery drawing to determine winning lottery entries for that drawing of the lottery game. Accordingly, a lottery drawing, as used herein, refers to a particular instance of a given lottery game, which may be an ongoing game (e.g., with periodic lottery drawings) or may be limited to a finite number of one or more rounds or drawings for a lottery game.

As used herein, a "lottery authority" is an entity primarily responsible for the operation and oversight of various lottery hardware, software, data and/or systems as described herein. A lottery authority therefore may comprise a governmental entity such as a state lottery organization and/or a lottery vendor operating one or more lottery hardware, software, data and/or systems as described herein on behalf of a governmental authority.

As used herein, a "lottery retailer" is an entity, location, or service providing for one or more of the following to take place, such as via a lottery retailer terminal or other device:

A lottery ticket may be purchased

A voucher/coupon for a lottery entry may be redeemed

A winning lottery ticket may be verified and redeemed for an eligible prize

A secondary award for a group's performance (e.g., over multiple lottery drawings), or for an individual group member's performance within a group, may be verified and redeemed Some lottery retailers may not provide all of these services, and it is possible that different lottery retailers may be used for different services. A lottery retailer may include, e.g., a web site or other retailer accessible via the Internet, a convenience store, a gas station, and/or supermarket.

As used herein, a "social network" database is a database associated with a social networking service provider. For example, a social network database may store registrant information, as well as an indication of relationships between one or more registrants. Existing social networking websites such as "MySpace", "Facebook", "Friendster", "Linkedln", and "Orkut" may store or otherwise utilize one or more social network database(s) to facilitate interactions between their members.

Various embodiments described in this disclosure enable individuals to participate in group lottery games, such as office pools, by utilizing an online (e.g., web-based) group lottery ticket configuration and tracking system. Using such a system, individuals may assemble groups of friends or colleagues to play games and monitor group play activity conveniently. In addition, as described herein, incentives and payouts may be created for group play occurring over the course of several drawings, and payouts and merchandise awards can be provided based on the group's overall performance over time.

By registering a group online at the lottery's group play website, group members can select their numbers in advance for each individual drawing. Once the players' numbers are selected, the system can store and track the information for all of the group's entries in a web-based group file. For each individual drawing, the group's numbers will be checked automatically, with e-mail or text-based alerts sent to group members when a specified amount is won.

In addition to playing for the big game jackpot on a per-draw basis, in some embodiments group play games can include an ongoing monthly "fantasy" prize play component, allowing the group to select a specific fantasy prize (or equivalent cash value) which all group members may qualify to win based on, for example, the group's overall monthly performance relative to other, similar-sized groups.

In some embodiments, all tickets in a ticket set, purchased by a group, are for the same lottery game (e.g., all Powerball tickets). It may be preferred, but is not necessary, that all players in a group contribute an equal amount (e.g., pay for 1 ticket each, or evenly split $50 in tickets). Where equal amounts are contributed, it may be preferred that all players in the pool are entitled to an equal share of any winnings. Where different amounts are contributed, it may be preferred that players in the pool are entitled to a share of any winnings proportional to their contribution.

FIG. 1 to FIG. 8 depict exemplary and non-limiting embodiments of a user interface such as may be presented by a controller to one or more member devices (e.g., personal computer, cell phone) in accordance with various embodiments described in this disclosure. The particular representations are provided to illustrate generally some features described in this disclosure, and other ways of representing the features and functionality described herein may be apparent to one of ordinary skill in the art upon consideration of this disclosure.

In particular, FIG. 1 to FIG. 8 provide examples of representative web pages that may be useful, for example, in providing a service by which players and other members of a group or lottery team may access, update, share and receive, for example, information related to lottery games, lottery drawings, lottery entries (e.g., lottery game payout for a particular winning lottery ticket), social networking and groups (e.g., group members, group performance score, group awards). In some embodiments, members of a group may be able to purchase one or more lottery entries (e.g., a ticket for a lottery drawing) from the controller or lottery retailer (e.g., using a credit card, online payment account or other financial account) and associate the purchased entries with the group.

Figure 2:
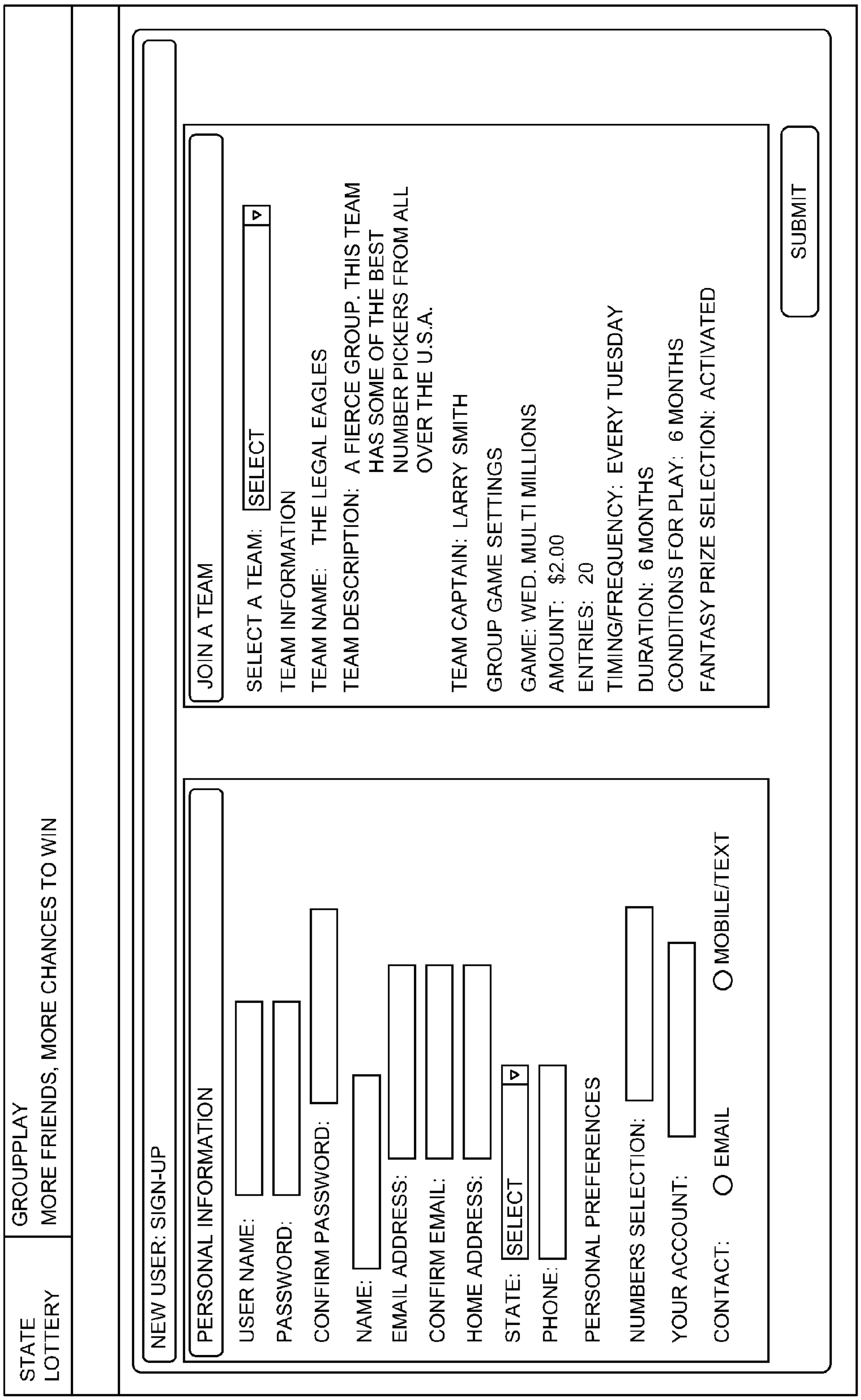
FIG. 2 is a representation of an exemplary and non-limiting embodiment of a user interface according to the disclosure.

FIG. 1 is a representative home page 1 in accordance with one embodiment. FIG. 2 is a representative new user sign-up page 2 in accordance with an embodiment for allowing a new user to register, for example, with a central controller or group play management service. Sign-up page 2 also illustrates an example of how a user may join a team, and provides some non-limiting examples of team information, including selection of a fantasy prize option.

Figure 3:
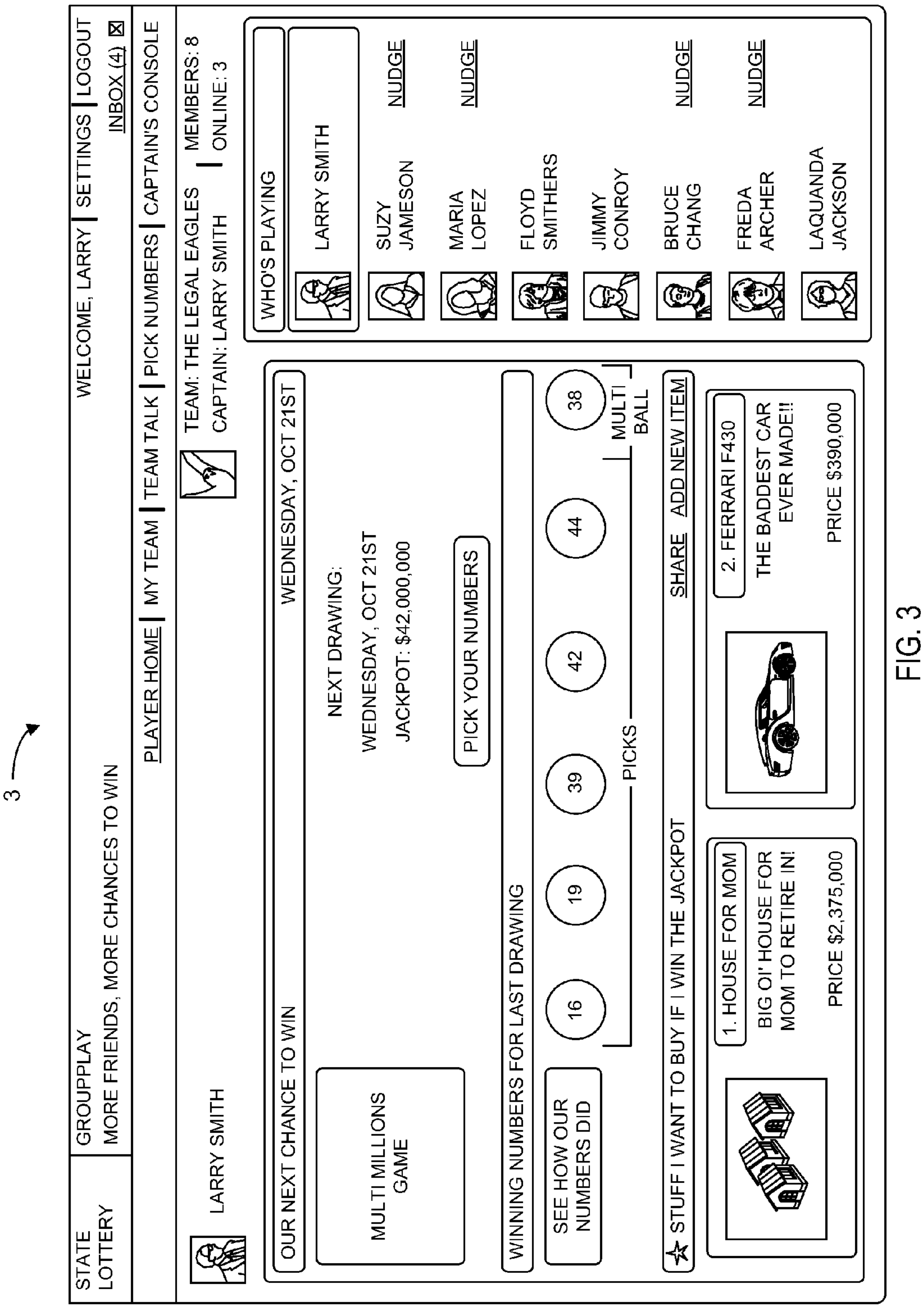
FIG. 3 is a representation of an exemplary and non-limiting embodiment of a user interface according to the disclosure.

FIG. 3 is a representative group member page 3 in accordance with an embodiment, including information about a particular group member, how the group's numbers did in a prior drawing, the next drawing, and fantasy prize items that member has indicated he would buy if he wins a lottery prize.

Figure 4:
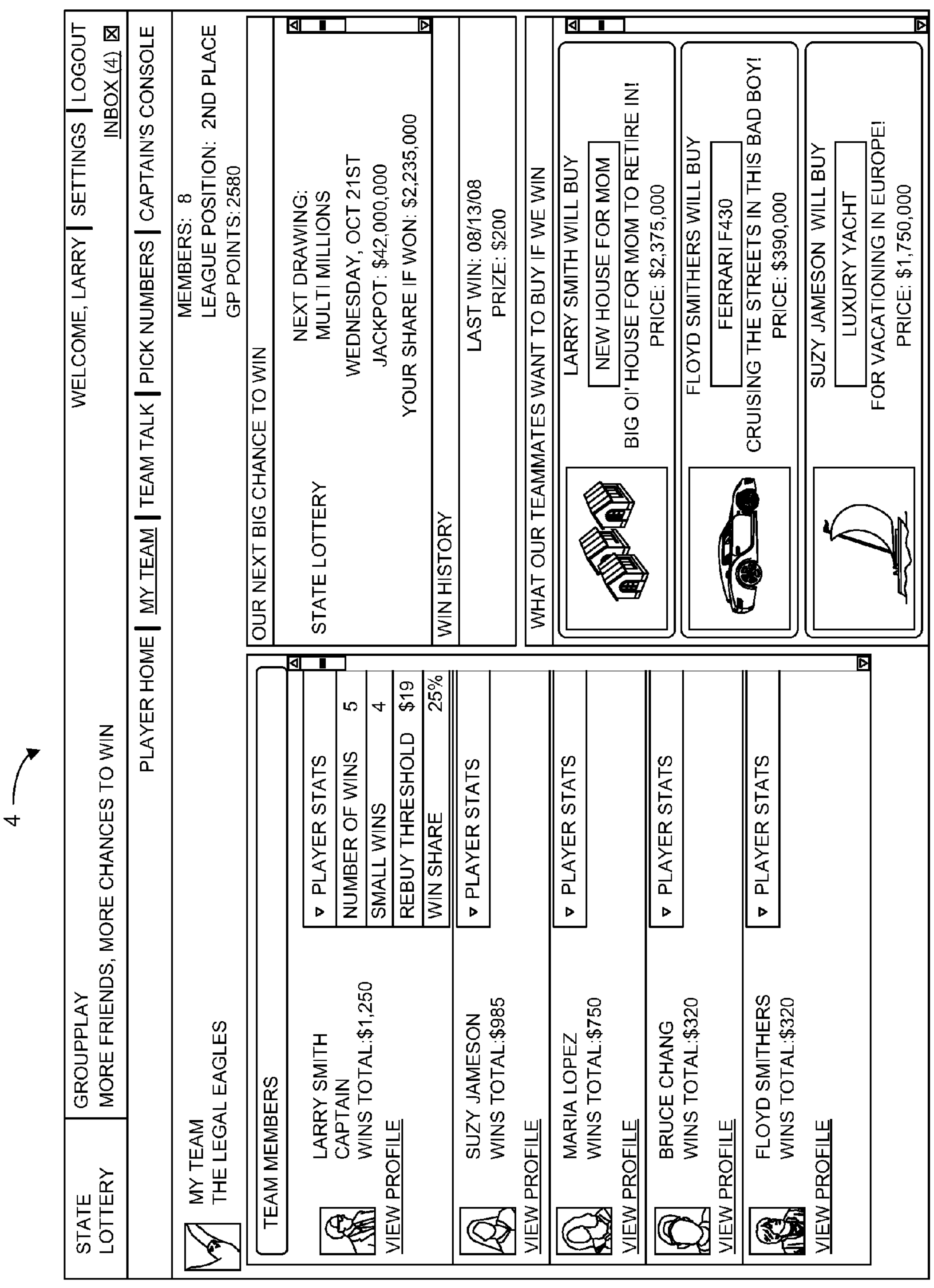
FIG. 4 is a representation of an exemplary and non-limiting embodiment of a user interface according to the disclosure.

FIG. 4 is a representative group page 4 in accordance with an embodiment, including information about members of the group, the group's performance in a prior drawing, the next drawing, player statistics (including a tracked number of wins, number of small wins, re-buy threshold, and respective share of any group winnings) the group's rank (e.g., based on a measure of performance or performance score), a measure of performance or performance score (e.g., a number of points associated with the group) and fantasy prize items that group members have indicated they would buy if they win a lottery prize.

Figure 5:
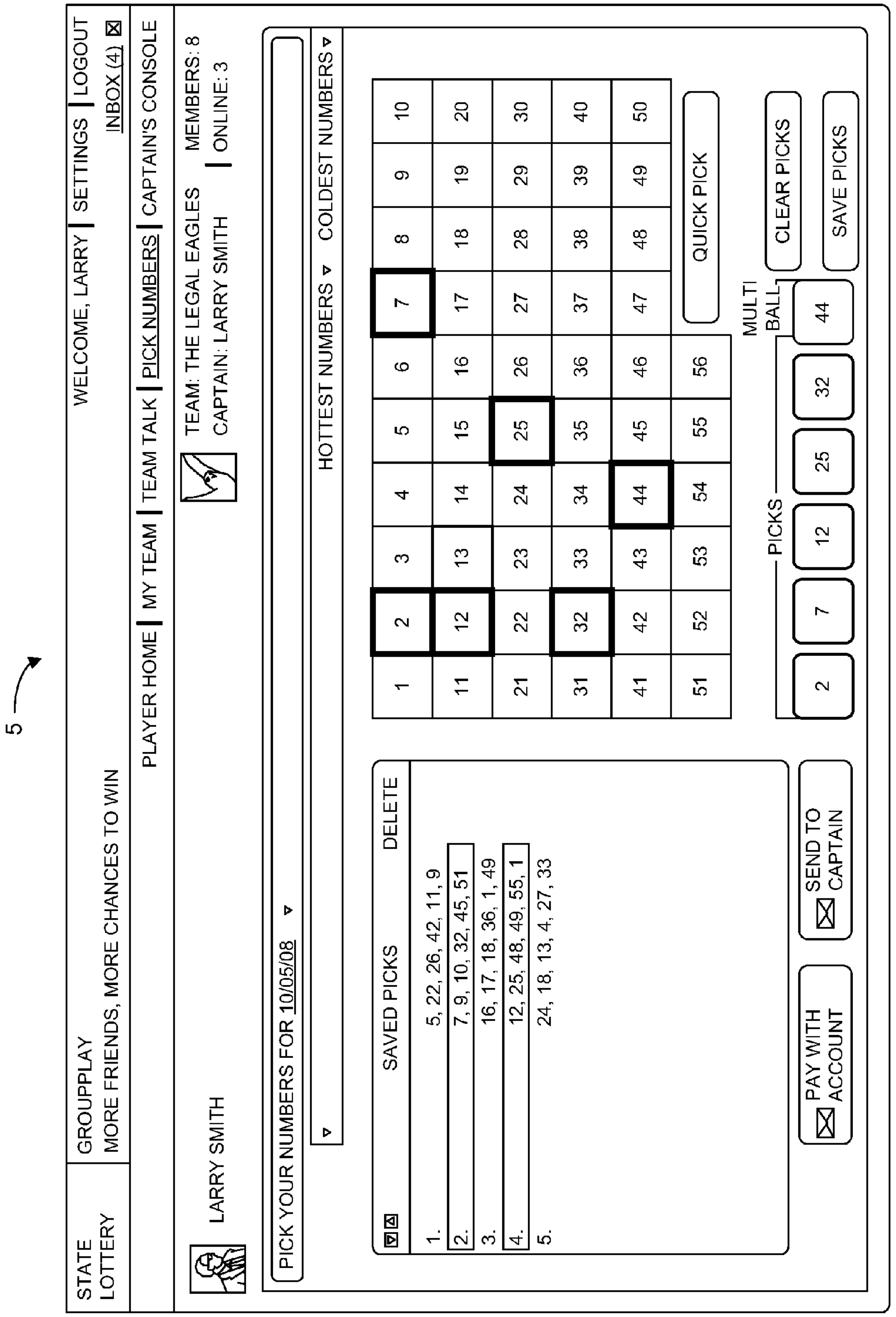
FIG. 5 is a representation of an exemplary and non-limiting embodiment of a user interface according to the disclosure.

FIG. 5 is a representative group member lottery number selection page 5 in accordance with an embodiment of the disclosure. Group member lottery number selection page 5 provides for member selection (e.g., using a mouse or other pointing device) of numbers for one or more lottery entries associated with the member's group, and provides for payment for one or more lottery entries using a financial account (e.g., credit card account, prepaid account, online payment account). Page 5 also provides for sending information about entries created by the member to a group captain.

Figure 6:
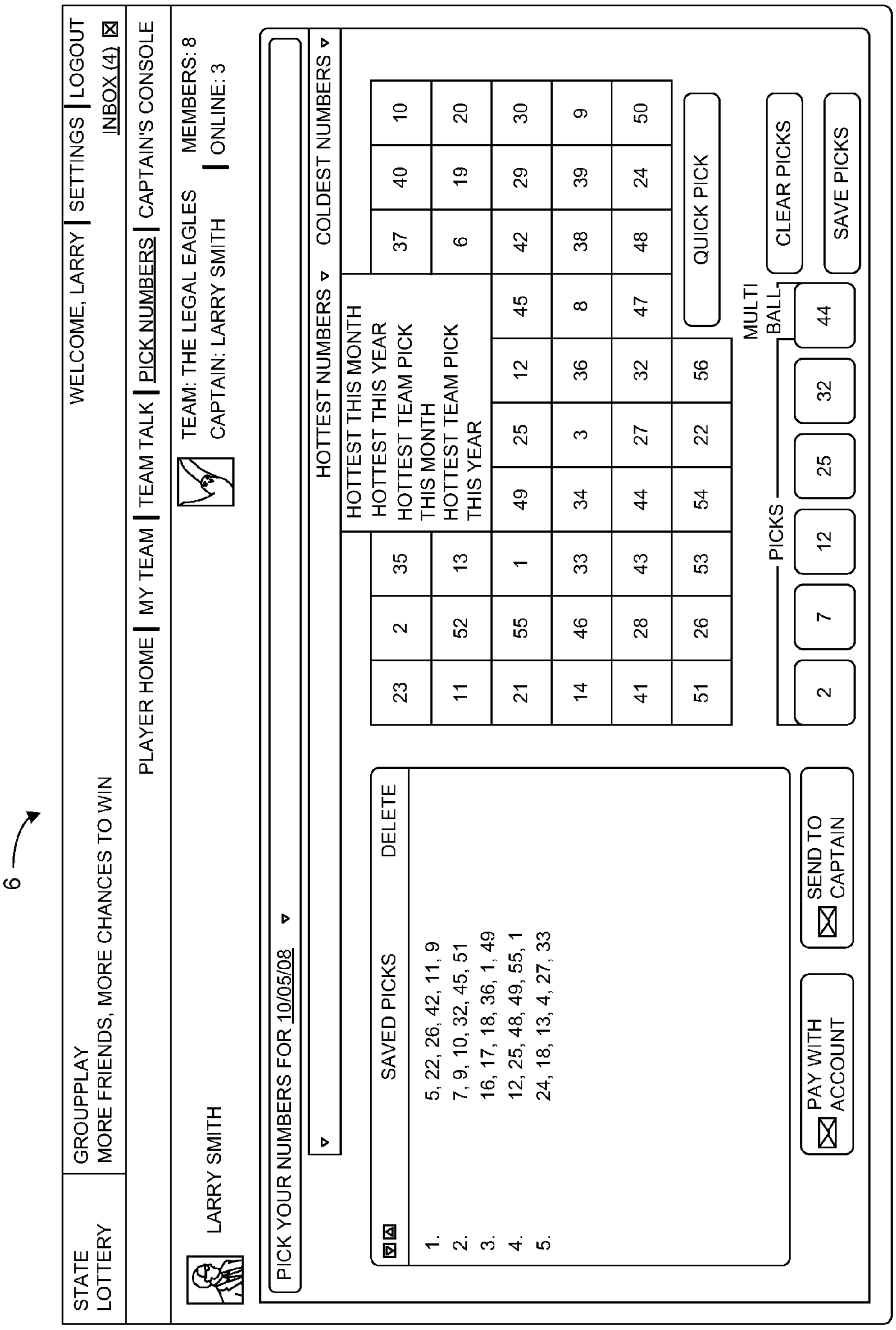
FIG. 6 is a representation of an exemplary and non-limiting embodiment of a user interface according to the disclosure.

FIG. 6 is a representative group member lottery number selection page 6 in accordance with an embodiment. Page 6 illustrates functionality allowing for outputting to a member, via the user interface (e.g., at the user's request), historic information about lottery numbers, including the most frequently drawn ("hottest") and least frequently drawn ("coldest") numbers during various periods of time. Some lottery players, when selecting numbers for a future drawing, may find it advantageous to have information about past performance of particular numbers in a lottery game.

Figure 7:
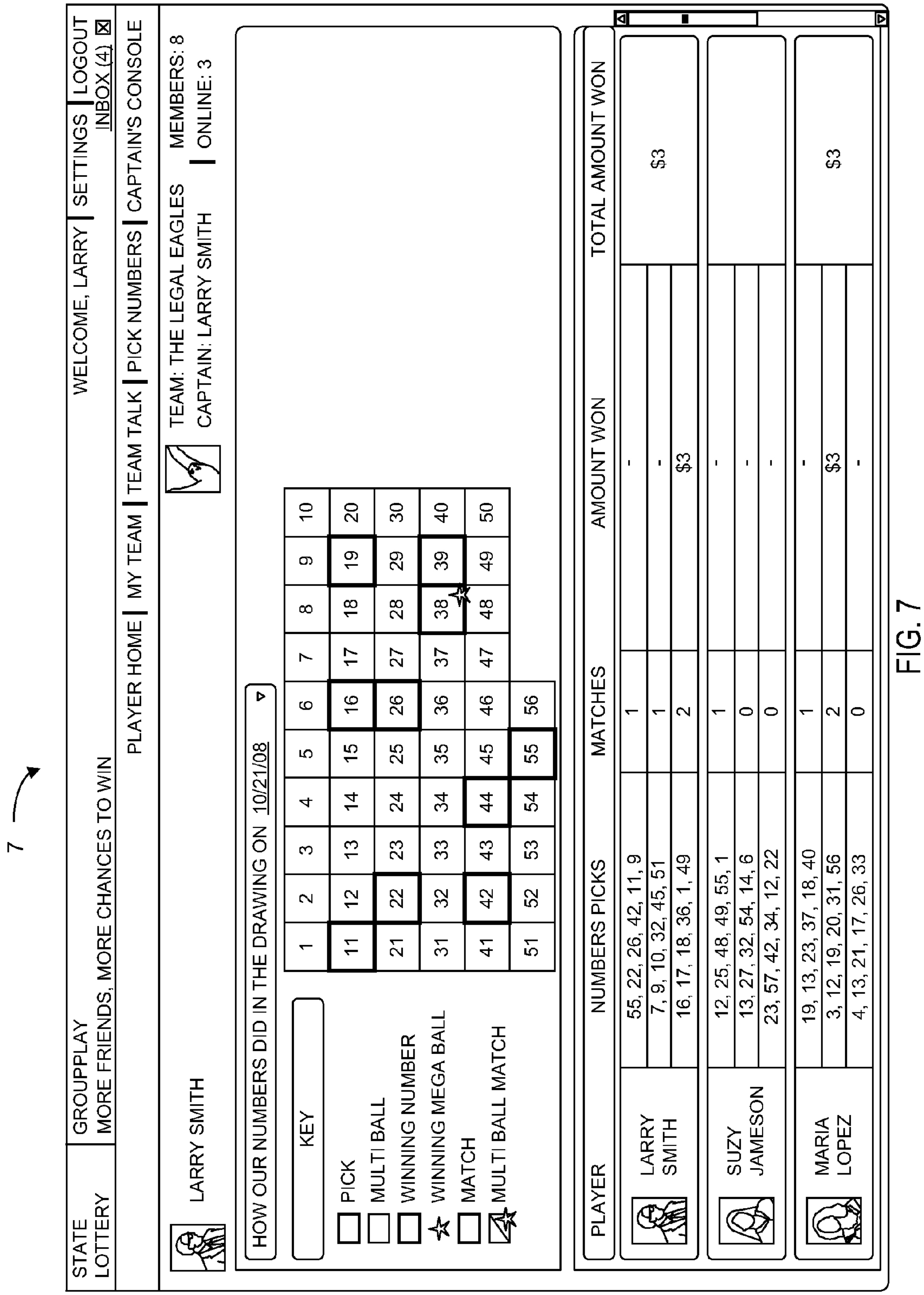
FIG. 7 is a representation of an exemplary and non-limiting embodiment of a user interface according to the disclosure.

FIG. 7 is a representative page 7 showing individual and group performance results associated with an instance of a lottery game (e.g., a particular lottery drawing), in accordance with an embodiment. Page 7 further depicts amounts won on lottery entries associated with specific members of a lottery team, as may be stored and analyzed in determining individual performance in a lottery game.

Figure 8:
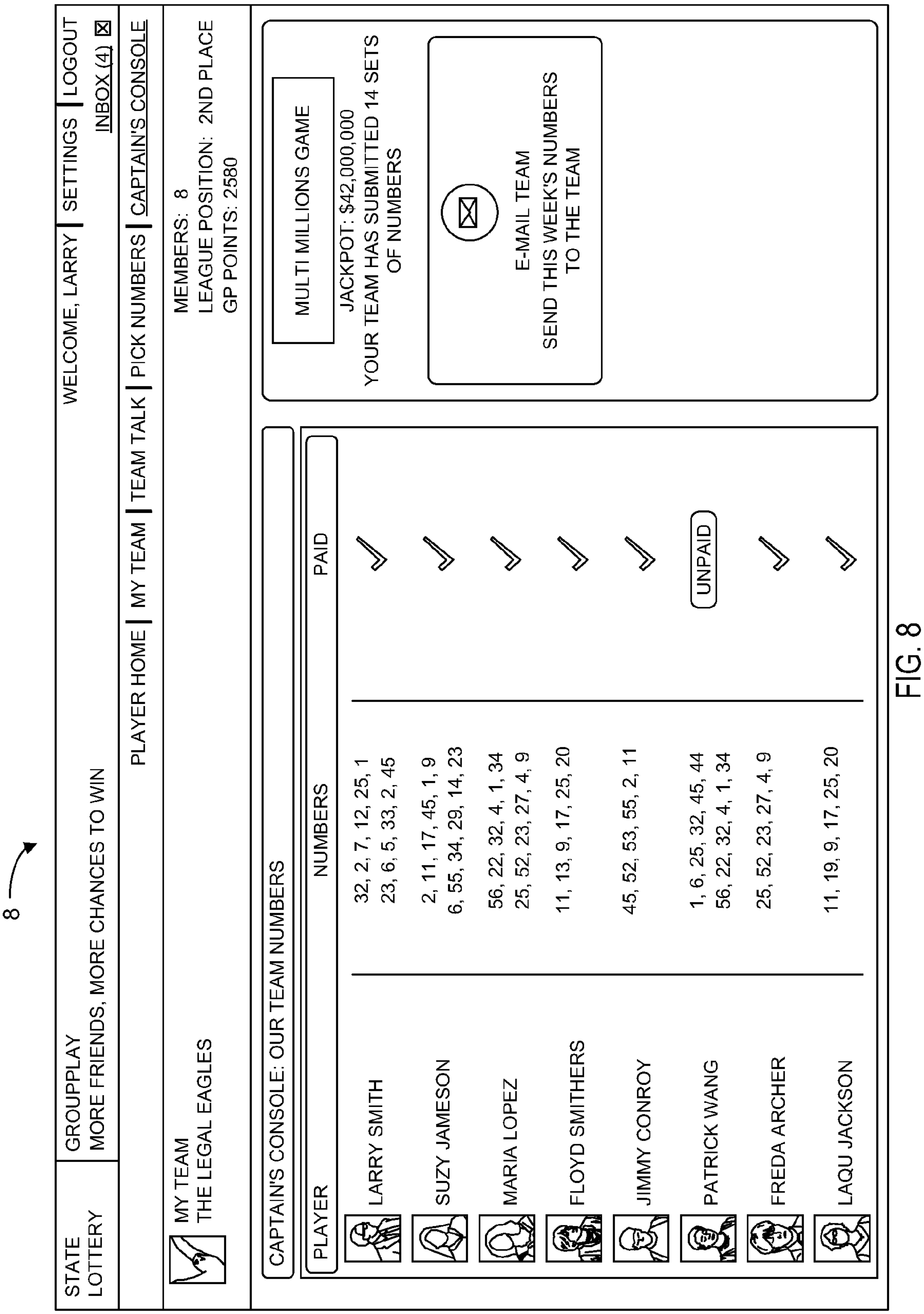
FIG. 8 is a representation of an exemplary and non-limiting embodiment of a user interface according to the disclosure.

FIG. 8 is a representative group communication page 8, in accordance with an embodiment, allowing a group member (e.g., a team captain) to communicate information about entries of the group for one or more future lottery drawings, including information about the numbers of each entry, information about what specific entries are associated with which particular group members, and information about whether group members have contributed to the purchase of the group's lottery entries.

Figure 9:
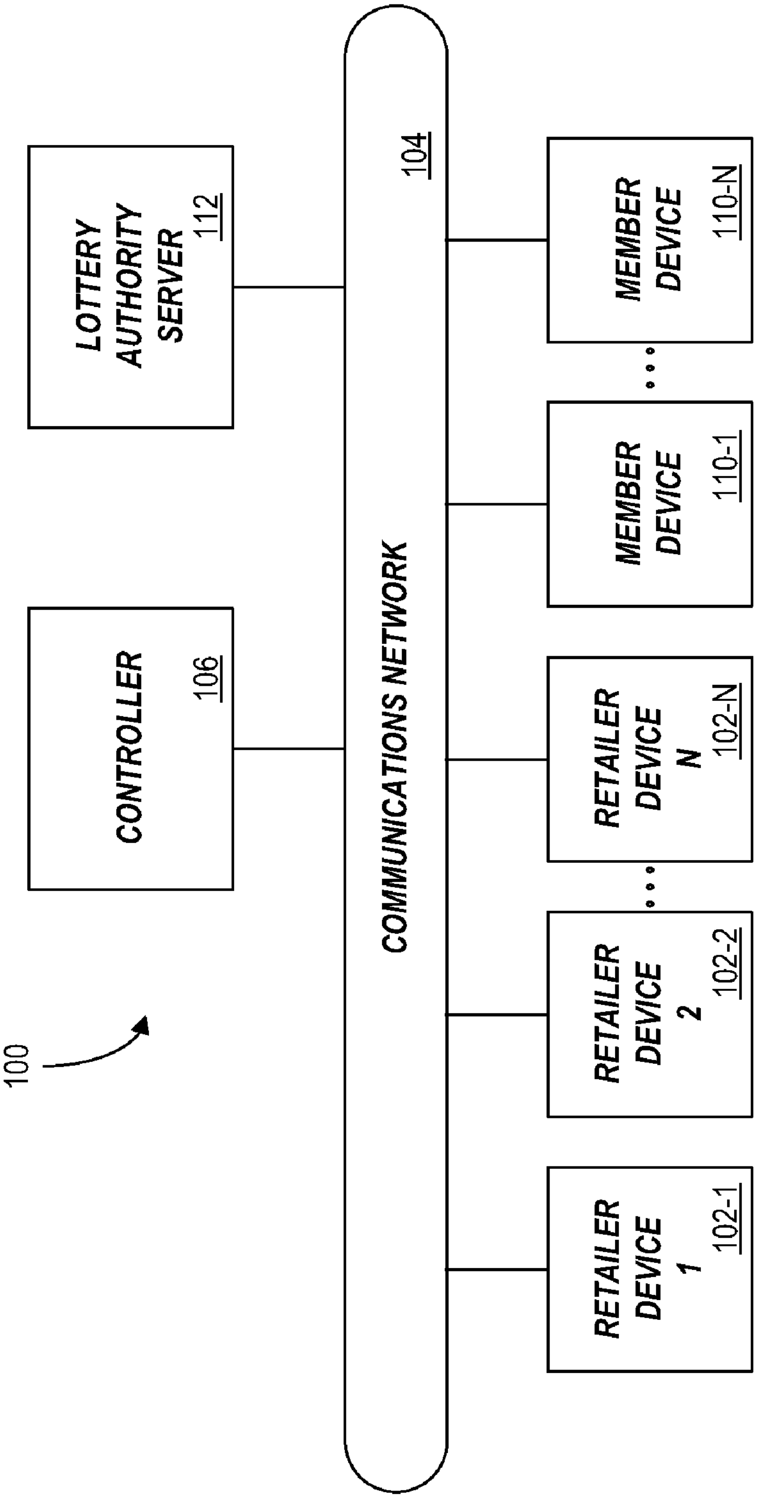
FIG. 9 is a diagram of an exemplary and non-limiting embodiment of a system according to the disclosure.

With reference to FIG. 9, there is illustrated a network environment system 100 for practicing exemplary and non-limiting embodiments disclosed herein. System 100 may comprise a plurality of lottery retailer devices 102-1 to 102-N, a communications network 104, a plurality of member devices 110-1 to 110-N, a controller 106 and a lottery authority server 112.

Generally, any or all of the retailer devices 102-1 to 102-N, member devices 110-1 to 110-N, controller 106 and lottery authority server 112 may operate to provide for one or more of:

- (i) receiving information associated with one or more lottery tickets including such data as: (a) ticket and/or lottery entry identifier(s), (b) lottery team identifier, (c) ticket association identifiers, (d) entry indicia, (e) individual entry awards (e.g., "Match at least 3 of 6 drawn numbers . . . ") and (f) group game awards (e.g., "Match at least [X] drawn numbers over [Y] time . . . ") associated with two or more associated lottery tickets;
- (ii) transmitting any or all of the received information to one or more other devices via the communications network 104; and
- (iii) outputting information including such data as: (g) information defining lottery entries and (h) information associated with one or more group prize awards or benefits.

In accordance with exemplary embodiments, each retailer device 102-1 to 102-N corresponds to (or is associated with) a particular lottery retailer. For example, lottery retailer terminal 1 (102-1) may be associated with a first lottery retailer such as a convenience store, and lottery retailer terminal 2 (102-2) may be associated with a second lottery retailer such as web-based lottery ticket vendor or reseller. It should be understood that any number of lottery retailer devices might be employed in a system 100, along with any number of corresponding controllers 106.

In accordance with exemplary embodiments, each member device 110-1 to 110-N corresponds to (or is associated with) one or more members (e.g., lottery players registered for group play with controller 106). For example, member device 110-1 may be a personal computer of a first lottery team member, and member device 110-N may be a mobile phone of a second lottery team member (of the same or a different team). It should be understood that any number of member devices might be employed in a system 100. A member device 110 may comprise one or more computing devices, such as a personal computer, personal digital assistant, handheld or other portable computer, telephone, mobile, wireless or cellular phone, and the like, operable to communicate with one or more of the devices of FIG. 1 via the communications network 104. In a web-based embodiment, a member device 110-1 may be configured with appropriate browser software for requesting, receiving and rendering web pages served by controller 106.

The controller 106 may operate to: (i) receive, store and transmit information associated with one or more lottery tickets and/or groups including such data as: (a) ticket and/or lottery entry identifier(s), (b) lottery team identifier, (c) ticket association identifiers, (d) entry indicia and (e) individual entry awards (e.g., "Match at least 3 of 6 drawn numbers . . . ") and (f) group game awards (e.g., "Match at least [X] drawn numbers over [Y] time . . . ") associated with two or more associated lottery tickets; (ii) determine group prize awards associated with two or more associated lottery tickets; and (iii) dividing a group prize award among team players; (iii) receive a redemption request associated with at least one of the lottery tickets, as will be described more fully below. In some embodiments, controller 106 may operate to generate and serve web pages and to generate and send status emails/SMS messages, or other transmissions (e.g., to one or more member devices 110).

In some exemplary embodiments, a retailer device 102-1, lottery authority server 112 and/or a member device 110-1 may be configured to perform some or all of the functions of the controller 106.

Generally, as explained above, the communications network 104 may comprise or include one or more local and/or wide-area network(s), proprietary and/or public network(s) (e.g., the Internet) for facilitating two-way data communications between the retailer terminals 102-1 to 102-N and the controller 106. The controller 106 (e.g., a group play management server) may communicate with other devices directly or indirectly, via a wired or wireless medium such as the Internet, via a local area network (LAN), via a wide area network (WAN), via an Ethernet, via a Token Ring, a telephone line, a cable line, a radio channel, an optical communications line, a satellite communications link, or via any appropriate communications means or combination of communications means. Any number and type of devices, including lottery retailer devices 102, lottery authority server 112 and member devices 110, may be in communication with the controller 106, and communication between the devices and the controller 106 may be direct or indirect, such as over the Internet through a Web site maintained by computer on a remote server, or over an online data network including commercial online service providers, bulletin board systems and the like. In some embodiments, the devices may communicate with one another and/or the controller 106 over RF, cable TV, satellite links and the like. A variety of communications protocols may be part of any such communications system, including but not limited to: Ethernet (or IEEE 802.3), SAP, ATP, Bluetooth, and TCP/IP.

In accordance with the disclosed exemplary embodiments, devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server computer may not be necessary and/or preferred. For example, in one or more embodiments, methods described herein may be practiced on a stand-alone member device 110 and/or a member device 110 in communication only with one or more other member devices 110. In such an embodiment, any functions described as performed by the controller 106 or data described as stored on the controller 106 may instead be performed by or stored on one or more member devices 110.

The retailer device 102 and member device 110 may include one or more processor(s) such as the PENTIUM® processor, manufactured by INTEL Corporation, or other processors manufactured by other companies, such as the AMD Athlon® processor manufactured by the Advance Micro Devices company. Generally, the processor is operative to perform or process instructions, and in particular, to operate in accordance with the various methods described herein. For example, the processor may be operable to allow the lottery retailer device 102 and member device 110 to transmit data to (and receive data from) one another, the lottery authority server, and the controller 106 of FIG. 1.

The lottery retailer device 102 may further include one or more input device(s). The input devices may include components such as an optical scanner and/or a barcode scanner, for reading and/or for deriving information associated with a lottery entry. For example, a lottery ticket may include registration marks, authenticity data, various codes, micro-printed indicia, one or more sense marks, and/or other lottery indicia that must be read, for example, to distinguish between one or more lottery entries (which may all be contained on one lottery ticket, for example). Examples of additional input devices of retailer device 102 or member device 110 include, but are not limited to, a keypad, a mouse, an image capturing device (e.g., an optical character recognition (OCR) device), a biometric reader, a portable storage device (e.g., a memory stick), and the like.

In accordance with non-limiting embodiments, the lottery retailer device input device(s) may comprise or include a clock. The clock may be employed to detect, derive and/or append time and for date information for use by the controller 106 to create a data record corresponding to lottery tickets or lottery entries purchased at the lottery retailer terminal 102.

The lottery retailer device 102 and member device 110 may further include one or more output device(s). Such output device(s) may include such components as a display for outputting information to a lottery player, a lottery team, or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket or lottery entry, audio/video output device(s), and the like.

The lottery retailer device 102 and member device 110 may also include one or more communications port(s), such as a serial port, modem or the like. Generally, the communications port may be operable to facilitate two-way data communications between devices in the system 100. In accordance with some embodiments, the communications port may operate to facilitate the transmission of information between the lottery retailer terminal 102 and a player or member device 110 such as a personal digital assistant (PDA), cell phone, and/or a dedicated (e.g., a proprietary) device.

The lottery retailer device 102 and member device 110 may further include a data storage device such as a hard disk, optical or magnetic media, random access memory (RAM) and/or read-only memory (ROM), or the like memory device. Generally, the data storage device stores a software program, the software program enabling the processor of the retailer device 102 to perform various functions including some or all of the various steps described herein. For example, in accordance with some embodiments, the retailer device 102 and/or member device 110 may be configured to perform some or all of the functions of the controller 106 and/or lottery authority server 112 (and vice versa). An example lottery retailer device 102 available in the marketplace is the EXTREMA® clerk-operated lottery terminal, distributed by Scientific Games Corporation of Alpharetta, Ga.

According to some embodiments, lottery authority server 112 (e.g., operated by or on behalf of a government lottery) may be operable to communicate, via communications network 104, information including, but not limited to, one or more of: drawing dates, drawing results, and payouts.

Figure 10:
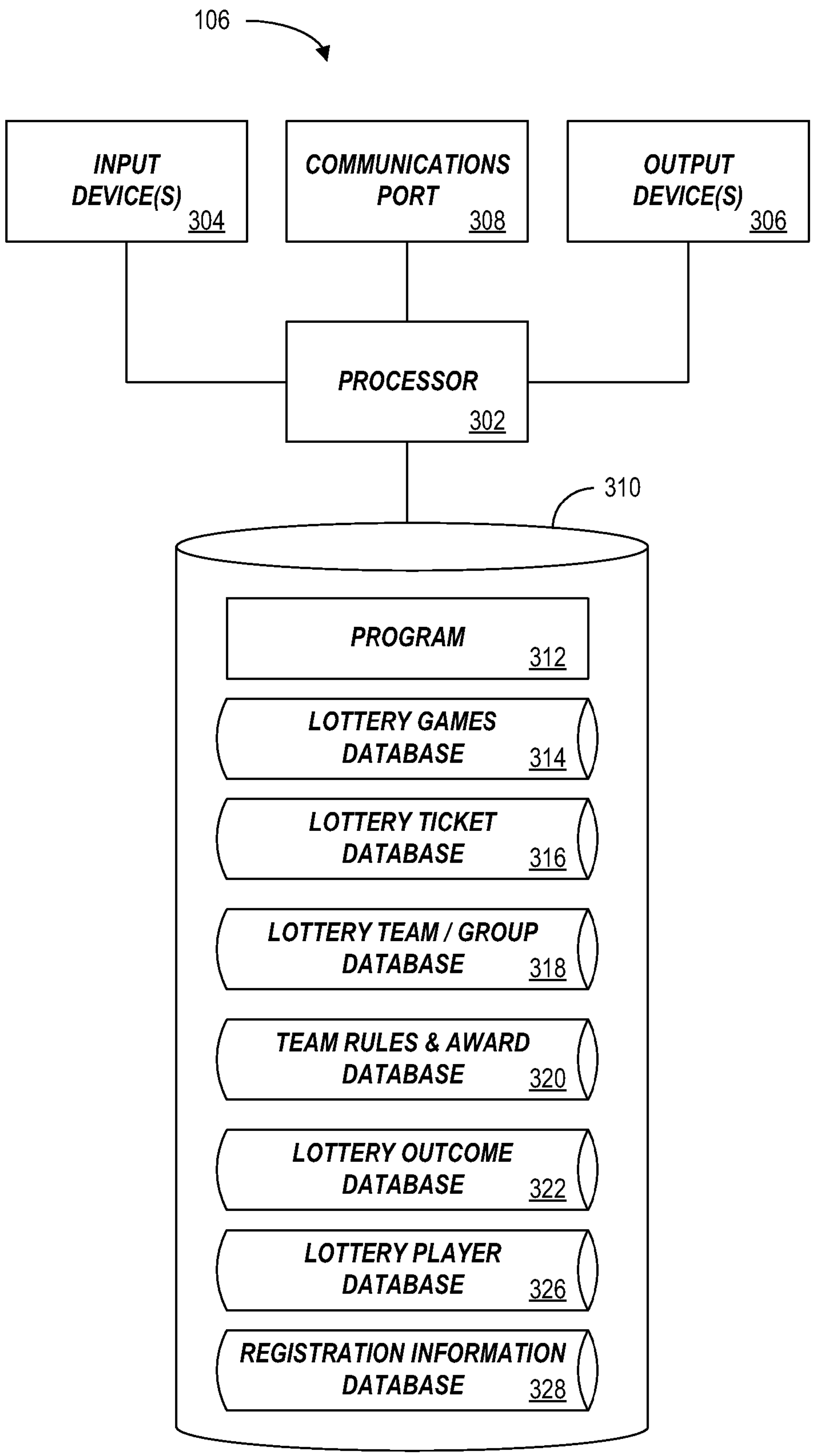
FIG. 10 is a diagram of an exemplary and non-limiting embodiment of a controller according to the disclosure.

With reference to FIG. 10, there is illustrated an exemplary and non-limiting embodiment of a controller 106 according to the disclosure. Similar to the lottery retailer device 102 and member device 110, the controller 106 may include one or more processor(s) 302 such as the PENTIUM® processor manufactured by INTEL Corporation, or the AMD Athlon® processor manufactured by the Advance Micro Devices company. Such a processor 302 functions to process instructions, and in particular, to operate in accordance with various methods described herein. For example, the processor 302 may operate to allow the controller 106 to transmit data to (and receive data from) the member devices 110-1 to 110-N. More specifically, the controller processor 302 may enable the transmission of data defining or identifying a lottery ticket or entry and/or team, as well as information defining one or more payout(s) associated with that lottery ticket, to a lottery team, to a lottery team member, or to a specific one of the lottery retailer devices 102-1 to 102-N, lottery authority server 112 or member devices 110-1 to 110-N. Thus, the controller may be implemented as a system controller, a dedicated hardware circuit, an appropriately programmed general-purpose computer, or any other equivalent electronic, mechanical or electro-mechanical device. In various embodiments, a controller may comprise, for example, a personal computer (e.g., which communicates with a remote lottery sales terminal) or mainframe computer. In some embodiments, the controller comprises a server operated by or on behalf of a lottery authority (e.g., lottery authority server 112).

The controller 106 may further include one or more input device(s) 304. Examples of such input devices include a keypad, a mouse, a touch-screen, a random number generator, a microphone, and other digital or analog input devices. According to some embodiments, the controller input device(s) 304 may comprise or include a clock. As described above, the clock may be employed to derive time and/or date information for use by the controller 300 to (i) generate a data record corresponding to lottery tickets or lottery entries purchased at the lottery retailer terminal 102, and/or (ii) create a data record corresponding to a lottery team and/or the association of two or more lottery tickets generated at the lottery retailer terminal 102.

Exemplary embodiments of the controller 106 further include one or more output device(s) 306. Example of output devices 306 include a monitor or other display for outputting information to a user of the controller 106 (e.g., for displaying information such as statistical or sales data, win and loss information, team and/or associated ticket information, and/or payout amounts), a printer for producing a physical record (e.g., a report, a paper slip, a voucher, a coupon, a ticket) of such data, and the like. In addition, the controller 106 may include one or more communications ports 308, such as a serial port, modem or the like, operable to facilitate two-way data communications between (i) the controller 106, (ii) one or more lottery retailer devices 102, (iii) one or more member devices 110 and/or (iv) lottery authority server 112.

The controller 106 may also include a data storage device 310 (e.g., a hard disk or hard drive, a media-based (removable) memory, or the like). In some embodiments, the controller data storage device 310 stores at least one software program 312, which includes a program to enable the processor 302 to perform some or all of the various steps and functions of at least one implementation of the methods described in detail herein. In addition, the controller data storage device 310 may operate to store (i) a lottery games database 314, (ii) a lottery ticket database 316, (iii) a lottery team/group database 318, (iv) a team rules and awards database 320, (v) a lottery outcome database 322, (vi) a lottery player database 326, and/or (vii) a registration information database 328.

In some embodiments, players may use one or more computing devices to obtain more information about the lottery games, lottery teams, lottery tickets associated with groups, and/or the specific lottery game that the player is playing. For example, a player may utilize a personal computer to access a website that contains lottery game hints, lottery game instructions, winning lottery entry payout information that includes base payout information and team payout information, services for managing group play of a lottery game, and the like.

With reference to FIG. 11, there is illustrated a tabular representation 400 of an exemplary embodiment of the controller lottery games database 314. The lottery games database 314 stores data associated with one or more lottery games and/or lottery game formats. It should be understood that the various database examples described herein include illustrative accompanying data as shown in the drawings. Consequently, the data appearing in the databases is exemplary in nature, and such data entries are not limiting with regard to functionality or to the types of data that may be stored therein.

With continued reference to FIG. 11, each record in the lottery games database 314 generally defines a game available for play and/or for purchase of lottery entries by a lottery player. In particular, for each game defined by an entry in the lottery games database 314, a game identifier field 402 stores data that uniquely identifies the lottery game of the corresponding record. The data stored in the game identifier field 402 may comprise, for each available game, a unique numeric, alphanumeric or other type of code that uniquely identifies the lottery game defined by the corresponding entry.

For each lottery game identified by an entry in the game identifier field 402, one or more associated game rules field(s) 406 may store data or information, including a textual description of the criteria required of a lottery entry to be successful (i.e., to win a prize) in the corresponding lottery game. For example, referring to row R400-1, the game identified as "GM-DRAW-001" in the game identifier field 402 corresponds to lottery game rules based on a standard "Pick 6" on-line lottery game, wherein a player selects six numbers and winning lottery entries match at least 3 of 6 drawn numbers. The lottery games database 314 also includes a Payout Criteria 1 field 408, Payout 1 field 410, Payout Criteria N field 412 and a Payout N field 414. For any particular "Pick-6" lottery game, more or less payout criteria and payout fields would be included, which will be explained in more detail below.

For example, the Connecticut Lottery Corporation provides a "Pick-6" on-line lottery game called "Classic Lotto" wherein players go to a lottery retailer and fill out a "Classic Lotto Play Slip" by choosing six different numbers from the ordinal range of 1 to 44 (inclusive) in each individual play section or board (alternately, a computer can randomly pick the numbers for the player, if the player so chooses). Players of "Classic Lotto" can play up to five boards on each selection slip, and pay one-dollar per entry. For example, a lottery player can pay a clerk at a lottery retailer five dollars to purchase five lottery entries, wherein each lottery entry includes six numbers selected from the 44 available choices. Thus, the player may fill in a pay slip and hand it to the clerk, who then enters the pay slip into the retailer terminal. The lottery terminal then issues a printed "Classic Lotto" ticket for the player to take home. The player keeps the ticket until the drawing for that lottery game, and then compares the number of his lottery entries to the drawn numbers to determine if he has won any prize(s).

With continued reference to FIG. 11, row R400-1 illustrates a Pick-6 lottery game identified as "GM-DRAW-001", and the payout criteria field 408 indicates that if the player matches 3 out of 6 drawn numbers, then a payout of three (3) dollars is made (see Payout Field 410). Larger payouts would also be determined for matching 4 out of 6 and for matching 5 out of 6 numbers as well (which payout criteria is not shown). The Payout Criteria N field 412 indicates that a win of 6 out of 6 matches pays out the top prize, and the top prize is yet to be determined as shown in Payout N field 414 (because the top prize is typically calculated by the lottery authority as a percentage of the total amount of money spent by players to purchase tickets, and the calculation may also include other variables that would serve to either increase or decrease the top prize value).

For each game corresponding to an entry in the game identifier field 402, one or more payout criteria fields (408 and 412) and a corresponding payout field (410 and 414) store data specifying the actual criteria and corresponding payouts for lottery tickets that satisfy such criteria. For example, using the "Pick-6" example above, the following table illustrates typical payout criteria and corresponding payouts:

| Criteria | Payout |
|---|---|
| Match 0/6 | 0 |
| Match 1/6 | 0 |
| Match 2/6 | 0 |
| Match 3/6 | $ 3 |
| Match 4/6 | $ 50 |
| Match 5/6 | $2,000 |
| Match 6/6 | Win Jackpot/Top Prize |

Lottery games database 314 also includes data for other lottery games. In particular, row R400-2 for lottery game GM-DRAW-002 is a "Pick-3" type of game, and the data includes a game rule 406 wherein a player must match the three drawn numbers in exact order. The payout criteria 408 for matching one number out of the three drawn in the correct order corresponds to a nominal-level payout value of three-dollars as shown in the Payout 1 field 410. In addition, a payout criteria for matching two out of three numbers (not shown) is stored, and payout criteria N (which is the third criteria in this example) recites that if the player matches all three numbers in order, then that lottery ticket corresponds to a high-level base payout 414 of five hundred dollars.

Referring to row R400-3, the lottery game GM-DRAW-003 corresponds to a "Pick-4" type of game, and includes a game rule 406 wherein a player may match up to four drawn numbers in any order. The Payout Criteria 1 in field 408 for matching two numbers out of the four drawn corresponds to a nominal-level payout value of five-dollars as shown in Payout 1 field 410. In addition, Payout Criteria N (which is the fourth criteria for this example) recites that if the player matches all four numbers (in exact order) then a high-level payout 414 of five thousand dollars is made. As explained earlier, the database 400 also includes entries for matching three out of the four numbers (with associated payout amounts) as well.

Row R400-(N−1) corresponds to lottery game GM-DRAW-N, which is a "Pick-10" type of game that includes a game rule 406 specifying that a player may select up to 10 numbers from a field or board of 80 numbers. If a player only picks one spot (i.e., only picks one number) as specified in the Payout 1 field 408, and that spot matches a drawn number then the player wins a nominal-level two-dollar prize as shown in the Payout 1 field 410. However, if the player picks ten spots and all ten match the drawn numbers as specified in Payout Criteria N field 412, then as shown in Payout N field 414 he is entitled to a high-level, one-hundred thousand dollar prize. As explained above, database entries would also exist to include all intermediate winning combinations, for example, payout amounts for obtaining three out of three matches numbers, four out of four matches, four out of five matches, five out of five matches (and possibly prizes for matching most numbers of a group, such as obtaining five out of six matches, six out of seven matches, and the like), and any other matching sets or match permutations as desired.

Lastly, row R400-N illustrates data for lottery game GM-INSTANT-N, which corresponds to an instant lottery game. This lottery game includes a game rule 406 specifying that a player scratches off the play area to reveal symbols, and if any three of such symbols match, then the prize payout corresponds to the symbols that match. In this case, the game rules are equivalent to the payout criteria. For example, if the player scratches off three matching symbols that each indicate “Two Dollars”, then a nominal level prize payout of two-dollars is awarded as indicated in the Payout 1 field 410. If the player matches three symbols that each indicates “$1,000.00”, then as shown in Payout N field 414 the player is entitled to that high-level amount as a prize.

With continued reference to FIG. 3, the lottery ticket database 316 stores data associated with lottery tickets and/or sets of lottery tickets. It should be understood that the various database examples described herein include illustrative accompanying data. Consequently, the data appearing in the databases is exemplary in nature, and such data entries are not limiting with regard to functionality or to the types of data that may be stored therein.

In accordance with exemplary embodiments, the lottery ticket database 316 may include information, such as lottery ticket identifiers (e.g., “14958085123”), lottery ticket numbers or entries (e.g., selected by the player, machine generated numbers, such as 23-05-15-09-21-34), a team identifier, if applicable (e.g., “Team #132940815, “Bob’s Bruisers”, or “N/A” for a ticket that is not part of a team), an identifier for a set of tickets we (e.g., pre-packaged booklet of lottery tickets), a terminal number (i.e., where the ticket was sold), a drawing date (i.e., which drawing(s) will be used to determine if the ticket is a winner), and/or an indication of whether the ticket is eligible for team play. For example, a player may be required to pay an additional fee when purchasing a ticket in order to qualify for team play or a player may be required to register with a lottery website and receive a player identifier in order to qualify for team play.

The lottery team/group database 318 stores data associated with lottery teams and/or associated lottery tickets. It should be understood that the various database examples described herein include illustrative accompanying data. Consequently, the data appearing in the databases is exemplary in nature, and such data entries are not limiting with regard to functionality or to the types of data that may be stored therein.

In accordance with exemplary embodiments, the lottery team database 318 may include information, such as team identifiers, ticket identifiers, minimum/maximum # of lottery tickets allowed per team, player name(s), and/or a date team was created/registered. Note that in some cases, players may not register a name, but only associate lottery tickets with a team. In such circumstances, “not applicable” or “N/A”, “not available”, or similar values may be entered within the database field.

The team rules and awards database 320 stores data associated with the various rules required for a team to win in a secondary game, wherein the rules are mainly based on lottery ticket symbols from the team’s lottery tickets, and the corresponding payouts and/or prizes. It should be understood that the various database examples described herein include illustrative accompanying data. Consequently, the data appearing in the databases is exemplary in nature, and such data entries are not limiting with regard to functionality or to the types of data that may be stored therein.

With reference to FIG. 12, there is illustrated a tabular representation 500 of an exemplary embodiment of the controller team rules and award database 320. The lottery team rules and award database 320 stores data associated with one or more group games and/or group game formats. It should be understood that the various database examples described herein include illustrative accompanying data as shown in the drawings. Consequently, the data appearing in the databases is exemplary in nature, and such data entries are not limiting with regard to functionality or to the types of data that may be stored therein.

With continued reference to FIG. 12, each record in the team rules and award database 316 generally defines a group game available for play by a lottery group. In particular, for each game defined by an entry, a game identifier field 502 stores data that uniquely identifies the group game of the corresponding record. The data stored in the group game identifier field 502 may comprise, for each available game, a unique numeric, alphanumeric or other type of code that uniquely identifies the group game defined by the corresponding entry.

For each lottery group game identified by an entry in the game identifier field 502, one or more associated group game rules field(s) 504 may store data or information, including a textual description of the criteria required of a group’s entries to be successful (i.e., to win a prize) in the corresponding lottery group game. For example, referring to row R500-1, the game identified as “GPGM-DRAW-001” in the group game identifier field 502 corresponds to group game rules wherein a group must match at least [x] drawn numbers over [y] time. The group games database 320 also includes a Payout Criteria 1 field 506, Payout 1 field 508, Payout Criteria N field 510 and a Payout N field 512.

The team outcome database 322 stores data associated with team outcomes (e.g., matching outcomes, aggregated ticket information from tickets associated with the team or one another). It should be understood that the various database examples described herein include illustrative accompanying data. Consequently, the data appearing in the databases is exemplary in nature, and such data entries are not limiting with regard to functionality or to the types of data that may be stored therein.

In some exemplary and non-limiting embodiments, the team outcome database 322 may include information, such as an outcome identifier and aggregated matching lottery ticket numbers for team. In accordance with some embodiments, the system 100 highlights or simply includes the matching team lottery numbers/entries as compared to a lottery drawing outcome. The team outcome database 322 may additionally include information, such as the total # of matching numbers, an outcome award (if any), a team identifier, and/or a ranking of players. In some embodiments, the ranking of players is based on the amount of contributing factors for the team win (e.g., a player with the most matching numbers may be rated/ranked higher, a team player with no matching numbers may be ranked last).

Figure 13:
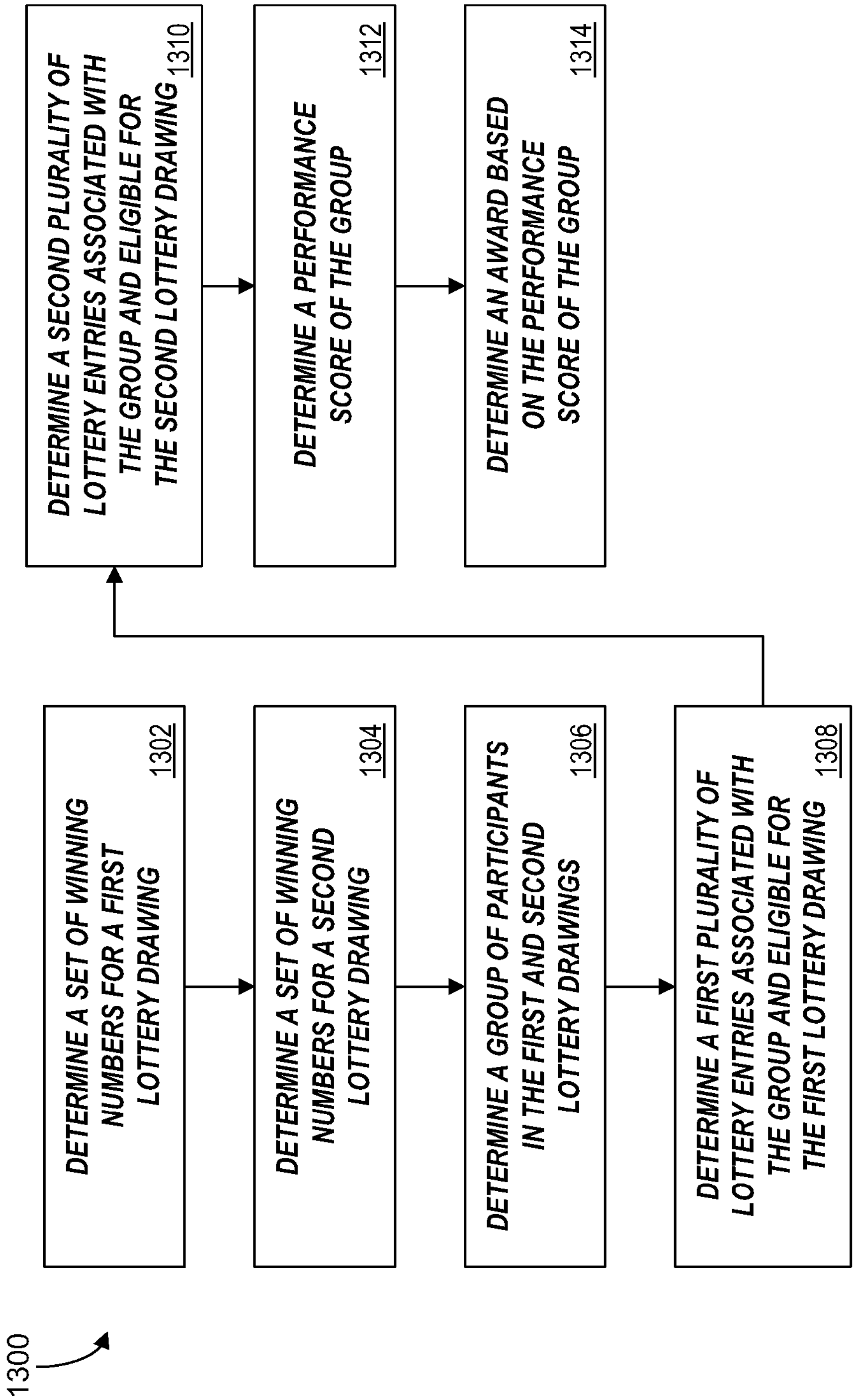
FIG. 13 is a flowchart of an exemplary and non-limiting embodiment of a method according to the disclosure.

With reference to FIG. 13, there is illustrated a flow chart of a method 1300 according to exemplary and non-limiting embodiments disclosed herein. The method 1300 may be performed, for example, by the controller 106. At step 1302 a set of winning is numbers is determined for a first lottery drawing. At step 1304 a set of set of winning numbers for a second lottery drawing is determined. At step 1306 a group of participants in the first and second lottery drawings is determined. At step 1308 a first plurality of lottery entries associated with the group and eligible for the first lottery drawing are determined, and at step 1310 the controller 106 determines a second plurality of lottery entries associated with the group and eligible for the second lottery drawing. The controller 106 determines a performance score of the group (step 1312) and at step 1314 determines an award for the group based on the performance score of the group.

Figure 14:
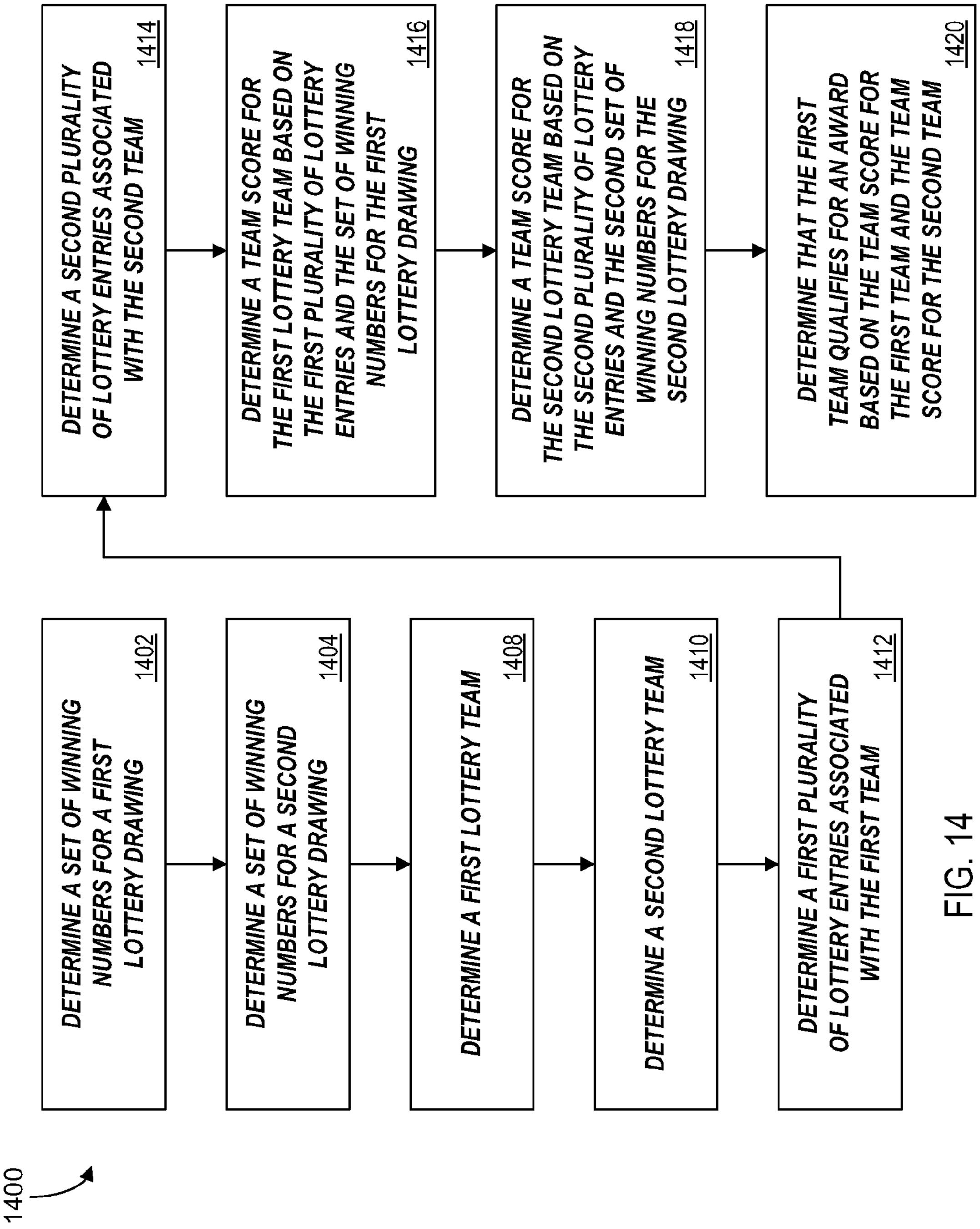
FIG. 14 is a flowchart of an exemplary and non-limiting embodiment of a method according to the disclosure.

With reference to FIG. 14, there is illustrated a flow chart of a method 1400 according to exemplary and non-limiting embodiments disclosed herein. The method 1400 may be performed, for example, by the controller 106. At step 1402 the controller 106 determines a set of winning numbers for a first lottery drawing and at step 1404 determines a set of winning numbers for a second lottery drawing. At step 1408 a first lottery team is determined, and at step 1410 a second lottery team is determined. At step 1412 a first plurality of lottery entries associated with the first lottery team is determined, and at step 1414 a second plurality of lottery entries associated with the second lottery team is determined. The controller 106 determines a team score for the first team based on the first plurality of lottery entries and the set of winning numbers for the first lottery drawing (step 1416). The controller determines a team score for the second team based on the second plurality of lottery entries and the set of winning numbers for the second lottery drawing (step 1418). The controller at step 1420 further determines that the first team qualifies for an award based on the team score for the first team and the team score for the second team (e.g., where the first team's score is higher or corresponds to a higher rank than the second team's score).

Figure 15:
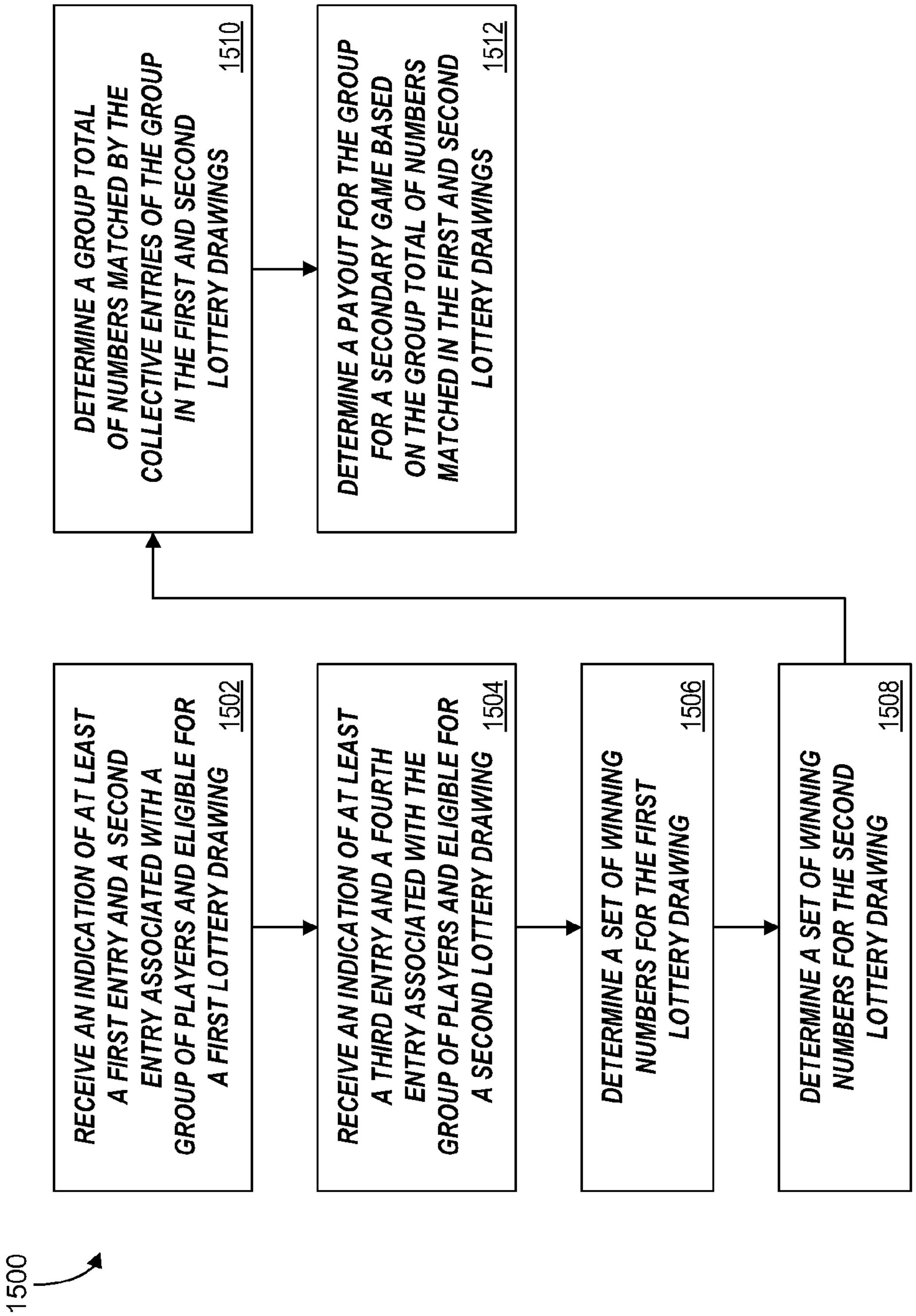
FIG. 15 is a flowchart of an exemplary and non-limiting embodiment of a method according to the disclosure.

With reference to FIG. 15, there is illustrated a flow chart of a method 1500 according to exemplary and non-limiting embodiments disclosed herein. The method 1500 may be performed, for example, by the controller 106 and comprises receiving an indication of at least a first entry and a second entry associated with a group of players and eligible for a first lottery drawing (step 1502); receiving an indication of at least a third entry and a fourth entry associated with the group of players and eligible for a second lottery drawing (step 1504); determining a set of winning numbers for the first lottery drawing (step 1506); determining a set of winning numbers for the second lottery drawing (step 1508); determining a group total of numbers matched by the collective entries of the group in the first and second lottery drawings (step 1510); and determining a payout for the group for a secondary game based on the group total of numbers matched in the first and second lottery drawings (step 1512).

A request for a lottery ticket may be received in various manners. According to some embodiments, the request may be received through via a lottery agent or via a group play management server. According to other non-limiting embodiments, the request for a lottery ticket may be received via lottery play slip. For example, a player may complete a Lottery Play Slip offering various information, such as (i) lottery entries or numbers for each ticket and (ii) a check box to associate multiple tickets with one another (e.g., for association with a team or team play). According to other non-limiting embodiments, the request for a lottery ticket may be received via a lottery terminal, a lottery kiosk, or the Internet. For example, a player may request a virtual lottery ticket through a state lottery Web site or an Internet retailer or reseller of lottery tickets. More generally, a request for a lottery ticket may be received through the use of an input device. For example, a player may purchase tickets by pressing a button on a web page or lottery ticket dispensing device (e.g., terminal, a kiosk, a cell phone).

In one embodiment, an indication of one or more players' acceptance or registration for a team play may be transmitted to a computer server or controller 106. According to some embodiments the controller 106 may store this information in a database (e.g., lottery team database 318). A controller 106 may use this information to aggregate data to determine team outcomes. In some embodiments, a controller 106 may divide team prize shares at the end of lottery play (e.g., communicating with team ticket holders to disclose outcomes) and may determine (i) eligibility of a lottery team for a secondary or additional prize (e.g., in a group-based game) and (ii) any secondary or additional prize earned by an eligible lottery team.

A lottery team may be created by various methods. According to some embodiments a lottery team may be created upon request from a player, a lottery, and/or a third-party affiliate. For example, a player may visit a state lottery Web site and create a team, wherein a team identifier is established and associated with the player. The player may add lottery ticket identifiers at his or her convenience. A lottery team may be created by associating two or more lottery tickets together. Once the association between the two or more lottery tickets is complete, then a team identifier may be established.

In accordance with one exemplary embodiment, a player may receive an invitation (e.g., a printed ticket from a lottery terminal with information on how to join a team, an email, etc) to join a lottery team. Such an invitation may be received from his or her family, friends, co-workers, acquaintances, other players, state lottery, local retailer, etc.

In another exemplary embodiment, a player may visit a Web site (e.g., a state lottery or third party web site) to search for a team to join. The web site may provide a search tool offering various search criteria. For example, a player may want to find a local team to join for Friday night's drawing or a drawing that offers a certain payout. In some embodiments, the player may send a request to join a team before being added to the team. In one embodiment, a player may post his or her desire to join (or create) a team and offer specific details that he or she is looking for. In some cases, the player posting the bulletin may leave contact information as well.

In one embodiment, a player may be allowed to join a lottery team. According to some embodiments the lottery player may receive acceptance to join a team (e.g., the player may receive an email or otherwise be contacted). The indication of acceptance may be sent from a player, a lottery, and/or a third-party affiliate. In accordance with some non-limiting embodiments, a player may be required to pay to join the team and/or pay a fee for eligibility to share in any award in a group-based game (e.g., over multiple drawings).

In accordance with exemplary and non-limiting embodiments, as ticket identifiers are added to a lottery team, an association is created between the team's tickets. A "ticket association number" or a "team identifier" may allow the controller to determine which tickets to review and thus, which symbols to consider for determining a team outcome. The lottery team database 318 may be updated to include an indication of a new team, or to add a ticket to an existing team.

In an exemplary embodiment, groups are entitled to any winnings from any individual tickets. For example if one of the group's tickets matches all the winning lottery numbers, then the group is entitled to the base jackpot prize. However, in some embodiments, the group's tickets (or ticket symbols) may offer additional opportunities within a secondary game with respect to multiple tickets collectively and/or the performance of the group in multiple lottery drawings.

Many lottery players enjoy fantasizing about things they would buy for themselves and for others should they win the lottery. In accordance with exemplary and non-limiting embodiments, lottery game players may record information, such as in lottery player database 326, which specifies how lottery winnings are to be dispensed. In some embodiments, a registration process may be used (e.g. by a state lottery service provider) to determine information associated with a gift provider, such as a lottery player. Information obtained during registration may be used in a process of indicating a potential gift (e.g. to be provided if/when a registrant/player obtains a sufficient lottery payout) to a gift recipient according to one or more of the embodiments of the disclosure. Information associated with a gift provider may be received by: a facilitator, a lottery authority, a lottery retailer, or a third party.

Numerous embodiments have been described, and are presented for illustrative purposes only. The described embodiments are not intended to be limiting in any sense. The disclosure is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present disclosure. Accordingly, those skilled in the art will recognize that the present disclosure may be practiced with various modifications and alterations. Although particular features of the present disclosure may be described with reference to one or more particular embodiments or figures that form a part of the present disclosure, and in which are shown, by way of illustration, specific embodiments of the disclosure, it should be understood that such features are not limited to usage in the one or more particular embodiments or figures with reference to which they are described. The present disclosure is thus neither a literal description of all embodiments of the disclosure nor a listing of features of the disclosure that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the disclosure" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present disclosure.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the embodiments of the disclosure, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present disclosure need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present disclosure. In addition, the databases may, in a known manner, be stored locally or remotely from a device that accesses data in such a database.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning. Finally, unless a claim element is defined by reciting the word "means" and a function without reciting any structure, it is not intended that the scope of any claim element be interpreted based on the application of 35 U.S.C. §112, sixth paragraph.

Although the disclosure has been presented with respect to preferred embodiments thereof, those skilled in the art will note that various substitutions and modifications may be made to those embodiments described herein without departing from the spirit and scope of the present disclosure.

What is claimed:

1. An apparatus comprising:

a processor; and a storage device in communication with the processor, the storage device storing instructions configured to direct the processor to:

determine a set of winning numbers for a first lottery drawing;

determine a set of winning numbers for a second lottery drawing;

determine a group of participants in the first and second lottery drawings, the group of participants having at least two members and in which the group of participants is one of a plurality of groups;

determine a first plurality of lottery entries associated with the group of participants, in which each of the first plurality of lottery entries is eligible for the first lottery drawing;

determine a second plurality of lottery entries associated with the group of participants, in which each of the second plurality of lottery entries is eligible for the second lottery drawing;

determine a performance score of the group of participants based on the first plurality of lottery entries associated with the group of participants, the set of winning numbers for the first lottery drawing, the second plurality of lottery entries associated with the group of participants and the set of winning numbers for the second lottery drawing; and determine an award for the group of participants based on the performance score of the group of participants, in which the award for the group of participants based on the performance score of the group of participants is different than a sum of any respective payouts associated with the first and second pluralities of lottery entries.

2. The apparatus of claim 1, the instructions being configured further to direct the processor to facilitate pooling by the members of the group of participants of the first plurality of lottery entries for the first lottery drawing.

3. The apparatus of claim 1, in which the group of participants is one of a plurality of groups registered with a central controller.

4. The apparatus of claim 1, in which the group of participants is one of a plurality of groups participating in at least the first lottery drawing.

5. The apparatus of claim 1, the instructions being configured further to direct the processor to determine that the group of participants is eligible to receive the award for the group.

6. The apparatus of claim 1, the instructions being configured further to direct the processor to determine a minimum number, greater than one, of lottery drawings that the group of participants must participate in to be eligible for the award; and determine that the group of participants participated in at least the minimum number of lottery drawings.

7. The apparatus of claim 1, the instructions being configured further to direct the processor to determine a plurality of lottery drawings that the group of participants must participate in to be eligible for the award; and determine that the group of participants participated in each of the plurality of lottery drawings.

8. The apparatus of claim 1, the instructions being configured further to direct the processor to determine a minimum number, greater than one, of lottery drawings that the group of participants must participate in during a pre-defined period of time to be eligible for the award; and determine that the group of participants participated in at least the minimum number of lottery drawings during the pre-defined period of time.

9. The apparatus of claim 1, the instructions being configured further to direct the processor to determine a minimum number, greater than one, of lottery entries that must be associated with the group of participants for the group to be eligible for the award; and determine that at least the minimum number of lottery entries are associated with the group of participants.

10. The apparatus of claim 1, the instructions being configured further to direct the processor to receive an indication of a payment by the group of participants in exchange for eligibility for a group-based secondary game.

11. The apparatus of claim 1, in which determining the performance score of the group of participants comprises:

determining a total number of lottery numbers of the first plurality of lottery entries and the second plurality of lottery entries;

determining a total number of winning lottery numbers of the first lottery drawing and of the second lottery drawing; and determining a difference between the total number of lottery numbers and the total number of winning lottery numbers.

12. The apparatus of claim 1, in which determining the performance score of the group of participants comprises:

determining a total number of lottery numbers of the first plurality of lottery entries and the second plurality of lottery entries;

determining a total number of winning lottery numbers of the first lottery drawing and of the second lottery drawing; and determining a ratio of the total number of winning lottery numbers to the total number of lottery numbers.

13. The apparatus of claim 1, in which determining the performance score of the group of participants comprises:

determining a total value of prizes won for the first plurality of lottery entries and the second plurality of lottery entries.

14. The apparatus of claim 1, in which determining the performance score of the group of participants comprises:

determining a total number of winning lottery entries of the first plurality of lottery entries and the second plurality of lottery entries.

15. The apparatus of claim 1, in which determining an award based on the performance score comprises:

evaluating the performance score of the group of participants based on a predetermined rule for a group-based secondary game.

16. The apparatus of claim 1, the instructions being configured further to direct the processor to determine a first performance score of the group of participants based on the first plurality of lottery entries and the set of winning numbers for the first lottery drawing.

17. The apparatus of claim 1, in which the central controller is embodied in a web-based group play management system.

18. The apparatus of claim 1, in which the central controller is operated on behalf of at least one lottery authority.

19. The apparatus of claim 1, in which the central controller is operated on behalf of at least one lottery vendor.

20. The apparatus of claim 1, in which the central controller is operated by a third party that is not a lottery authority and is not a lottery vendor.

21. The apparatus of claim 1, the instructions being configured further to direct the processor to determine a second group of participants in the first lottery drawing, the second group having at least two members, in which the second group of participants is not identical to the group of participants;

determine a first plurality of lottery entries associated with the second group of participants, in which each of the first plurality of lottery entries associated with the second group of participants is eligible for the first lottery drawing;

determine a performance score of the second group of participants based on the first plurality of lottery entries associated with the second group of participants, and the set of winning numbers for the first lottery drawing; and in which determining the award for the group of participants based on the performance score of the group of participants comprises:

comparing the performance score of the group of participants to the performance score of the second group of participants.

22. An apparatus comprising:

a processor;

an output device in communication with the processor; and a storage device in communication with the processor, the storage device storing instructions configured to direct the processor to:

receive an indication of at least a first entry and a second entry associated with a first group of players and eligible for a first lottery drawing of a lottery game, in which the first entry is associated with a first set of numbers, in which the second entry is associated with a second set of numbers, and in which the first group of players is one of a plurality of groups of players eligible for participation in a secondary game;

receive an indication of at least a third entry and a fourth entry associated with the first group of players and eligible for a second lottery drawing of the lottery game, in which the third entry is associated with a third set of numbers, and in which the fourth entry is associated with a fourth set of numbers;

determine a set of winning numbers for the first lottery drawing;

determine a set of winning numbers for the second lottery drawing;

determine a group total of numbers matched by the collective entries of the first group of players in the first and second lottery drawings by comparing the set of winning numbers for the first lottery drawing with the first set of numbers and the second set of numbers, and comparing the set of winning numbers for the second lottery drawing with the third set of numbers and the fourth set of numbers; and determine a payout for the first group of players for the secondary game based on the group total of numbers matched in the first and second lottery drawings.

23. The apparatus of claim 22, in which the payout for the first group of players for the secondary game is different than a sum of any respective payouts associated with the first, second, third and fourth entries of the lottery game.

24. The apparatus of claim 22, the instructions being configured further to direct the processor to facilitate pooling of the first, second, third and fourth entries by the members of the first group of players.

25. The apparatus of claim 22, the instructions being configured further to direct the processor to determine that the first group of players is eligible for participation in the secondary game.

26. The apparatus of claim 22, the instructions being configured further to direct the processor to determine a minimum number, greater than one, of lottery drawings that the first group of players must participate in to be eligible for participation in the secondary game; and determine that the first group of players participated in at least the minimum number of lottery drawings.

27. The apparatus of claim 22, the instructions being configured further to direct the processor to determine a plurality of lottery drawings that the first group of players must participate in to be eligible for participation in the secondary game; and determine that the first group of players participated in each of the plurality of lottery drawings.

28. The apparatus of claim 22, the instructions being configured further to direct the processor to determine a minimum number, greater than one, of lottery drawings that the first group of players must participate in during a pre-defined period of time to be eligible for participation in the secondary game; and determine that the first group of players participated in at least the minimum number of lottery drawings during the pre-defined period of time.

29. The apparatus of claim 22, the instructions being configured further to direct the processor to determine a minimum number, greater than one, of lottery entries that must be associated with the first group of players for the first group of players to be eligible for participation in the secondary game; and determine that at least the minimum number of lottery entries are associated with the first group of players.

30. The apparatus of claim 22, the instructions being configured further to direct the processor to receive an indication of a payment by the first group of players in exchange for eligibility for participation in the secondary game.

* * * * *